(12) United States Patent
Hirano et al.

(10) Patent No.: US 8,228,507 B2
(45) Date of Patent: Jul. 24, 2012

(54) QUANTUM ENTANGLEMENT GENERATING SYSTEM AND METHOD, AND QUANTUM ENTANGLEMENT GENERATING AND DETECTING SYSTEM AND METHOD

(75) Inventors: Takuya Hirano, Toshima-ku (JP); Yujiro Eto, Bunkyo-ku (JP)

(73) Assignees: Japan Science and Technology Agency, Saitama (JP); The Gakushuin School Corporation, Tokyo (JP)

( * ) Notice: Subject to any disclaimer, the term of this patent is extended or adjusted under 35 U.S.C. 154(b) by 354 days.

(21) Appl. No.: 12/673,972

(22) PCT Filed: Aug. 11, 2008

(86) PCT No.: PCT/JP2008/064436
§ 371 (c)(1),
(2), (4) Date: Feb. 17, 2010

(87) PCT Pub. No.: WO2009/025195
PCT Pub. Date: Feb. 26, 2009

(65) Prior Publication Data
US 2011/0032532 A1    Feb. 10, 2011

(30) Foreign Application Priority Data
Aug. 18, 2007    (JP) ................................. 2007-213205

(51) Int. Cl.
*G01B 9/02* (2006.01)
(52) U.S. Cl. ...................................... 356/450
(58) Field of Classification Search .................. 356/450, 356/459–476
See application file for complete search history.

(56) References Cited

U.S. PATENT DOCUMENTS

| | | | | |
|---|---|---|---|---|
| 5,004,341 A | * | 4/1991 | Grynberg et al. | 356/459 |
| 5,339,182 A | | 8/1994 | Kimble et al. | |
| 5,982,788 A | * | 11/1999 | Hemmati | 372/21 |
| 2006/0083376 A1 | * | 4/2006 | Kawamoto et al. | 380/256 |

FOREIGN PATENT DOCUMENTS

JP    4-172329 A    6/1992

OTHER PUBLICATIONS

Braunstein et al., "Quantum information with continuous variables", Reviews of Modern Physics, vol. 77, Apr. 2005, pp. 513-577. Mentioned on pp. 2-3 of as-filed specification.

(Continued)

*Primary Examiner* — Tarifur Chowdhury
*Assistant Examiner* — Jonathon Cook
(74) *Attorney, Agent, or Firm* — Chen Yoshimura LLP

(57) ABSTRACT

A quantum entanglement generating system includes: a laser light source for producing a light beam of light frequency $2f_0$; a ring interferometer comprising a beam splitter into which the light beam of light frequency $2f_0$ is incident and a plurality of mirrors, the beam splitter and the mirrors forming an optical path in the form of a ring; a parametric amplifier inserted in the optical path of the ring interferometer for producing a beam of light of light frequency $f_0$ upon receiving the light beam of light frequency $2f_0$ incident into the optical parametric amplifier; and a dispersive medium inserted in the optical path of the ring interferometer for varying relative optical path length for the light beam of light frequency $2f_0$ and the light beam of light frequency $f_0$.

23 Claims, 8 Drawing Sheets

OTHER PUBLICATIONS

Zhang et al., "Quantum teleportation of light beams", Physical Review A, Mar. 11, 2003, vol. 67, No. 3, pp. 033802-1-033802-16. Cited in ISR below and mentioned on pp. 2-3 of as-filed specification.

Eto et al., "Observation of squeezed light at 1.535 μm using a pulsed homodyne detector", Optics Letters, Jun. 15, 2007, vol. 32, No. 12, pp. 1698-1700. Cited in ISR below and mentioned on pp. 3 and 19 of as-filed specification.

Duan et al., "Inseparability Criterion for Continuous Variable Systems", Physical Review Letters, Mar. 20, 2000, vol. 84, No. 12, pp. 2722-2725. Mentioned on pp. 3 and 36 of as-filed specification.

Zhang et al., "Experimental generation of broadband quadrature entanglement using laser pulses", Physical Review A, Jul. 16, 2007, vol. 76, No. 1-A, pp. 012314-1-012314-9. Cited in ISR below.

Matsuoka, "Chokkoisou Sukuizudo Joutai no Hassei to Kensyutsu", Shokabo Text Series—Butsurigaku Ryoshi Kogaku, 6th edition, Kabushiki Kaisha Shokabo, Jun. 20, 2006, pp. 166 to 169. Cited in ISR below as a concise explanation of relevance.

International Search Report (ISR) issued in PCT/JP2008/064436 for Examiner consideration, citing Foreign Patent Document No. 1 and Non-Patent Literature Document Nos. 2-3 and 5-6 listed above.

Written Opinion (PCT/ISA/237) issued in PCT/JP2008/064436. Concise Explanation of Relevance: This Written Opinion considers that the claims are described by or obvious over the references Nos. 1-5 cited in ISR above.

International Preliminary Report on Patentability Chapter II (IPEA/409) issued in PCT/JP2008/064436.

Eto et al., "Continuous-variable entangled state generation using pulsed light at telecommunication wavelength", Meeting Abstracts of the Physical Society of Japan, Hokkaido University, Sapporo Campus, 62th Annual Meeting, Sep. 21-24, 2007, vol. 62, Issue 2, Part 2, pp. 192.

Eto et al., "Continuous-variable entangled state generation using pulsed light at telecommunication wavelength 2", Meeting Abstracts of the Physical Society of Japan, Kinki University, Headquarters Campus, 63rd Annual Meeting, Mar. 22-26, 2008, vol. 63, Issue 1, Part 2, pp. 176.

* cited by examiner

QUANTUM ENTANGLEMENT GENERATING SYSTEM AND METHOD, AND QUANTUM ENTANGLEMENT GENERATING AND DETECTING SYSTEM AND METHOD

TECHNICAL FIELD

The present invention relates to a quantum entanglement generating system and a quantum enlargement generating and detecting system and to a quantum entanglement generating method and a quantum enlargement generating and detecting method. More specifically, it relates to a system for and a method of generating quantum entanglement of continuous variables using a secondary nonlinear optical effect, and to a system that is capable of detecting generated quantum entangled beams, simultaneously with its generation as well as a method for its detection.

BACKGROUND ART

Quantum information techniques constitute a technology or a field of the technology that utilizes a quantum mechanical effect directly to achieve information processing performance unachievable so far. Quantum entanglement is a most important resource in the quantum information techniques. Utilization of the quantum entanglement permits actualizing absolutely safe communications and computation processing at a speed incommensurably higher than heretofore.

A quantum entangled state is a state that physical systems at a plurality of spatially separated locations are mutually correlated, thus the state that such a plurality of physical systems cannot be treated isolated. If physical systems at two distant locations have a quantum entangled state in common, then measurements conducted at the two locations cause in their results a correlation which cannot be explained in the classical theory.

The term "quantum entanglement" is used in general to refer to a quantum entangled state itself, or a physical phenomenon which the entangled state exhibits and which is brought about peculiar in the quantum theory, or to state the concept that the quantum theory involves an inseparable characteristic. The quantum entanglement is used herein, however, as the term to indicate a quantum entangled state.

Quantum information processing adopts mainly two approaches, one of which uses a discrete physical quantity and the other of which uses a continuous physical quantity (see, e.g., Non-Patent Reference 1). In the case of light, use is generally made of the quadrature amplitude of an electric field as such a physical quantity taking a continuous physical value. The quantum entanglement for continuous physical quantities is termed a continuous variable quantum entanglement.

Mention is made of conventional methods of generating a continuous variable quantum entanglement. The method used most initially uses a non-degenerate parametric amplifier (see, e.g., Patent Reference 1). Patent Reference 1 introduced an experiment in which potassium titanate phosphate (KTP) was used as a nonlinear medium and phase matching of type II was effected to generate a signal and an idler light beams which are in a mutually orthogonal polarized state. The term "non-degenerate" refers to difference in the polarized state. Such signal and idler light beams as generated by parametric amplification using phase matching of type II are quantum correlated and thus capable of generating a continuous variable quantum entanglement.

In a conventional method of using the phase matching of type II, however, a difference in index of reflection of the nonlinear medium to signal and idler light beams made it technically difficult to bring the light resonators into simultaneous resonance with these two light beams. Further, the phase matching of type II in which beams tended in general to work off caused the quantum entanglement to deteriorate in quality.

In the method next performed, two squeezed light beams are generated and combined at a beam splitter with a transmissivity and a reflectance both of 50% to generate quantum entanglement. Then, the two squeezed beams need to be precisely controlled so as to have their relative phase difference of $\pi/2$.

For example, refer to Non-Patent Reference 2 in which a parametric amplifier placed in a ring resonator to effect phase matching of type 1 is used to generate squeezed beams which are traveling clockwise and anticlockwise along a ring and which are combined at a beam splitter laid outside of the ring to generate quantum entanglement. This method has the problem that after leaving the ring resonator and then to be combined at the beam splitter, the two squeezed beams that follow the different paths make it difficult to maintain the relative optical path length between these two paths stably.

Patent Reference 1: H. J. Kimble et al., U.S. Pat. No. 5,339,182, Aug. 16, 1994

Non-Patent Reference 1: S. L. Braunstein and P. van Loock, Rev. Mod. Phys. Vol. 77, p. 513, 2005

Non-Patent Reference 2: T. C. Zhang, et al., Phys. Rev. A. Vol. 67, p. 033802, 2003

Non-Patent Reference 3: Yujiro Eto, et al., Optics Letters, Vol. 32, pp. 1698-1700, 2007

Non-Patent Reference 4: L. M. Duan, et al., Physical Review Letters, Vol. 84, p. 2722, 2000

DISCLOSURE OF THE INVENTION

Problems to be Solved by the Invention

In the conventional method using the two squeezed beams, the difference in optical path length must continually be monitored and be stabilized by feedback control. The problems arise, however, that not only it is achieved to stabilize the relative optical path length with finite accuracy, but the equipment needed to this end must become complicated.

In view of the problems mentioned above, it is a first object of the problem to provide a quantum entanglement generating system whereby in entanglement generation by combining two squeezed light beams their relative optical path length can stably be controlled. A second object of the present invention is to provide a method of generating a quantum entanglement.

It is a third object of the present invention to provide a system that is capable of detecting a quantum entanglement beam generated in the entanglement generating system, simultaneously with its generation. It is a fourth object of the present invention to provide a method of generating a quantum entanglement beam and further, detecting a so generated quantum entanglement, simultaneously with its generation.

The Invention for Solving the Problems

In order to achieve the first object mentioned above, there is provided in accordance with the present invention a quantum entanglement generating system which comprises: a laser light source for producing a light beam of light frequency $2f_0$; a ring interferometer comprising a beam splitter into which the light beam of light frequency $2f_0$ is incident and a plurality of mirrors, the beam splitter and the mirrors forming an optical path in the form of a ring; an optical parametric amplifier inserted in the optical path of the ring interferometer for producing a light beam of light frequency $f_0$ upon receiving a light beam of light frequency $2f_0$ incident into the optical parametric amplifier; and a dispersive medium inserted in the optical path of the ring interferometer for varying relative optical path length for the light beam of light frequency $2f_0$ and the light beam of light frequency $f_0$, whereby two light beams of light frequency $2f_0$ split into by the beam splitter so as to travel mutually contrariwise in direction of advance in the ring interferometer are injected into the optical parametric amplifier to generate a first and a second squeezed light beam traveling mutually contrariwise in direction of advance in the ring interferometer, and the first and second squeezed light beams upon adjustment of their relative phase at a selected value through the dispersive medium are combined at the beam splitter, thereby generating quantum entangled beams.

In the system described above, the optical path of the ring interferometer is preferably formed of the sides of a polygon of triangle or more angle in the ring interferometer in which the beam splitter is disposed at an apex of the polygon with the mirrors lying at its remaining apexes, respectively.

The optical path of the ring interferometer is preferably a triangular optical path in which the beam splitter and a first and a second of the mirrors are arranged in turn anticlockwise, wherein the dispersive medium is disposed in the optical path between the beam splitter and the first mirror in the ring interferometer, and the optical parametric amplifier is disposed in the optical path between the first and second mirrors in the ring interferometer.

The optical path of the ring interferometer is preferably a rectangular optical path in which the beam splitter and a first, a second and a third of the mirrors are arranged in turn anticlockwise, wherein the optical parametric amplifier is disposed in the optical path between the first and second mirrors in the ring interferometer, and the dispersive medium is disposed in the optical path between the beam splitter and the third mirror in the ring interferometer.

On the optical axis there is preferably disposed a condenser means, each between the optical parametric amplifier and the first mirror and between the optical parametric amplifier and the second mirror. The optical parametric amplifier preferably has an optical waveguide structure consisting of an electrooptic crystal.

The dispersive medium preferably consists of two glass plates.

The laser light source preferably comprises a light source for producing a light beam of light frequency $f_0$ and a second harmonic generator for converting the incident light beam of light frequency $f_0$ from the light source into a light beam of light frequency $2f_0$.

The second harmonic generator preferably has an optical waveguide structure consisting of an electrooptic crystal.

The beam splitter preferably has a transmissivity and a reflectance of about 50%, alike to both light beams of light frequency $f_0$ and light frequency $2f_0$.

The ring interferometer is preferably formed on a plane.

In order to achieve the second object mentioned above, the present invention provides a quantum entanglement generating method which comprises: producing a light beam of light frequency $2f_0$ from a laser light source; injecting the light beam from the laser light source into a ring interferometer comprising an optical path of a beam splitter and mirrors, and an optical parametric interferometer and a dispersive medium which are disposed in the optical path; splitting the injected light beam at the beam splitter into two light beams traveling mutually contrariwise in direction of advance in the ring interferometer; advancing one of the split light beams from the optical parametric amplifier into the dispersive medium to generate a first squeezed light beam of light frequency $f_0$; advancing the other of the split light beams from the dispersive medium into the optical parametric amplifier to generate a second squeezed light beam of light frequency $f_0$; setting relative phase between the first and second squeezed light beams at a selected value through the dispersive medium; and combining the first and second squeezed light beams at the beam splitter, thereby generating quantum entangled beams.

In the method mentioned described, the relative phase between the first and second squeezed light beams is preferably set at $\pi/2$. The quantum entangled beams comprises a first quantum entangled beam passing through the beam splitter and a second quantum entangled beam reflecting on the beam splitter.

According to the system and method mentioned above, it is possible to generate a quantum entanglement stably by maintaining the relative phase stably between two squeezed light beams generated in the ring interferometer.

In order to achieve the third object mentioned above, the present invention provides a quantum entanglement generating and detecting system which comprises: a light source part comprising a pulsed laser light source of light frequency $f_0$ and a second harmonic generator into which the light beam of light frequency $f_0$ is incident to produce a light beam of light frequency $2f_0$, the light source part emitting a pulsed laser light beam of light frequency $f_0$ and a pulsed laser light beam of light frequency $2f_0$ on a common axis; a ring interferometer comprising a beam splitter into which the light beam of light frequency $2f_0$ is incident and a plurality of mirrors, the beam splitter and mirrors forming an optical path in the form of a ring; an optical parametric amplifier inserted in the optical path of the ring interferometer for producing a light beam of light frequency $f_0$ upon receiving a light beam of light frequency $2f_0$ incident into the optical parametric amplifier; a dispersive medium inserted in the optical path of the ring interferometer for varying relative optical path length for the light beam of light frequency $2f_0$ and the light beam of light frequency $f_0$; and a homodyne detector, whereby two light beams of light frequency $2f_0$ split into by the beam splitter so as to travel mutually contrariwise in direction of advance in the ring interferometer are injected into the optical parametric amplifier to generate a first and a second linearly polarized, squeezed light beam of light frequency $f_0$ traveling mutually contrariwise in direction of advance in the ring interferometer, relative phase between the first and second squeezed light beams is adjusted at a selected value through the dispersive medium, the first and second squeezed light beams are combined at the beams splitter, thereby generating quantum entangled beams, and as a signal light beam the linearly polarized quantum entangled beam of light frequency $f_0$, and as a local-oscillator light beam the pulsed laser light beam of light frequency $f_0$ emitted from the light source part and having a polarization orthogonal to the signal light beam, are both injected into the homodyne detector to detect a quadrature amplitude.

Preferably in the system described above, the quantum entangled beams comprises a first and a second quantum entangled beam and the homodyne detector comprises a first and a second homodyne detector, the first and second quantum entangled beams constituting signal light beams to the first and second homodyne detectors, respectively.

The beam splitter preferably has a transmissivity and a reflectance of about 50%, alike to both a horizontally polarized light beam of light frequency $f_0$ and a horizontally polarized light beam of light frequency $2f_0$, and has a reflectance of about 100% to a vertically polarized light beam of light frequency $f_0$.

The homodyne detector preferably comprises: an electrooptic crystal into which the signal light beam and the local-oscillator light beam are incident, a half wave plate for polarizing the light beams incident into the electrooptic crystal, a beam splitter for combining the light beams polarized at the half wave plate to split into a transmitted and a reflected light beam, detectors for sensing the two split light beams, respectively, and a means for providing a differential between outputs from the detectors.

The homodyne detector preferably comprises a filter into which the signal light beam and the local-oscillator light beam are incident for transmitting the light frequency $f_0$ and light frequency $2f_0$, a quarter wave plate for varying a phase between the light beams from the filter, a beam splitter for combining the light beams from the quarter wave plate to split into a transmitted and a reflected light beam, detectors for sensing the two split light beams, respectively, and a means for providing a differential between outputs from the detectors.

The system preferably further comprises: a dispersive medium disposed between the signal and local-oscillator light beams and the homodyne detector wherein the homodyne detector comprises a filter for transmitting a light beam of light frequency $f_0$ and a light beam of light frequency $2f_0$ out of light beams passing through the dispersive medium, a beam splitter for combining light beams from the filter to split into a transmitted and a reflected light beam, detectors for sensing the two split light beams, respectively, and a means for providing a differential between outputs from the detectors.

The ring interferometer is preferably formed on a plane.

In order to achieve the fourth object mentioned above, the present invention provides a quantum entanglement generating and detecting method which comprises: producing, on a common optical axis, a light beam of light frequency $f_0$ from a laser light source and a light beam of light frequency $2f_0$ generated via a second harmonic generator from the laser light source; injecting the light beam of light frequency $2f_0$ from the laser light source into a ring interferometer comprising an optical path in the form of ring comprising a beam splitter and a plurality of mirrors and an optical parametric amplifier and a dispersive medium arranged in the optical path; splitting the injected light beam at the beam splitter into two light beams traveling mutually contrariwise in direction of advance in the ring interferometer; advancing one of the split light beams from the optical parametric amplifier into the dispersive medium to generate a first linearly polarized, squeezed light beam of light frequency $f_0$; advancing the other of the split light beams from the dispersive medium into the optical parametric amplifier to generate a second linearly polarized, squeezed light beam of light frequency $f_0$; setting relative phase between the first and second squeezed light beams at a selected value through the dispersive medium; combining the first and second squeezed light beams through the beam splitter, thereby generating a linearly polarized quantum entangled beam of light frequency $f_0$; deriving from the linearly polarized quantum entangled beam of light frequency $f_0$, a signal light beam for a homodyne detector; passing the light beam of light frequency $f_0$ from the laser light source through the ring interferometer via an optical path identical to that for the one split light beam to provide a light beam of a polarization orthogonal to the signal light beam for use as a local oscillator light beam for the homodyne detector; and the homodyne detector detecting a quadrature amplitude of the signal light beam.

In the method described above, a filter for blocking the light beam of light frequency $2f_0$ is preferably inserted on an optical axis, each in front and rear of the optical parametric amplifier to suspend generation of the quantum entangled beams.

According to the system and method described above, it is possible to generate a quantum entanglement stably by maintaining the relative phase stably between two squeezed light beams generated in the ring interferometer. Further, a local-oscillator light beam for the homodyne detector can be furnished coaxially with a light ray into the ring interferometer to make it possible to achieve stable homodyne detection of quantum entangled beams.

Effects of the Invention

According to a quantum entanglement generating system and a quantum entanglement generating method of the present invention, it is possible to generate an quantum entanglement stably by maintaining the relative phase stably between two squeezed light beams advancing mutually contrariwise in the ring interferometer.

According to a quantum entanglement generating and detecting system and a quantum entanglement generating and detecting method of the present invention, it is possible to generate an quantum entanglement stably and to achieve homodyne detection of a quantum entangled beam by maintaining the relative phase stably between two squeezed light beams traveling mutually contrariwise in direction of advance in the ring interferometer. Also, a quantum entangled beam and a local-oscillator light beam can be coaxially furnished to better the stability of homodyne detection.

REFERENCE NUMERALS

Figure 1:
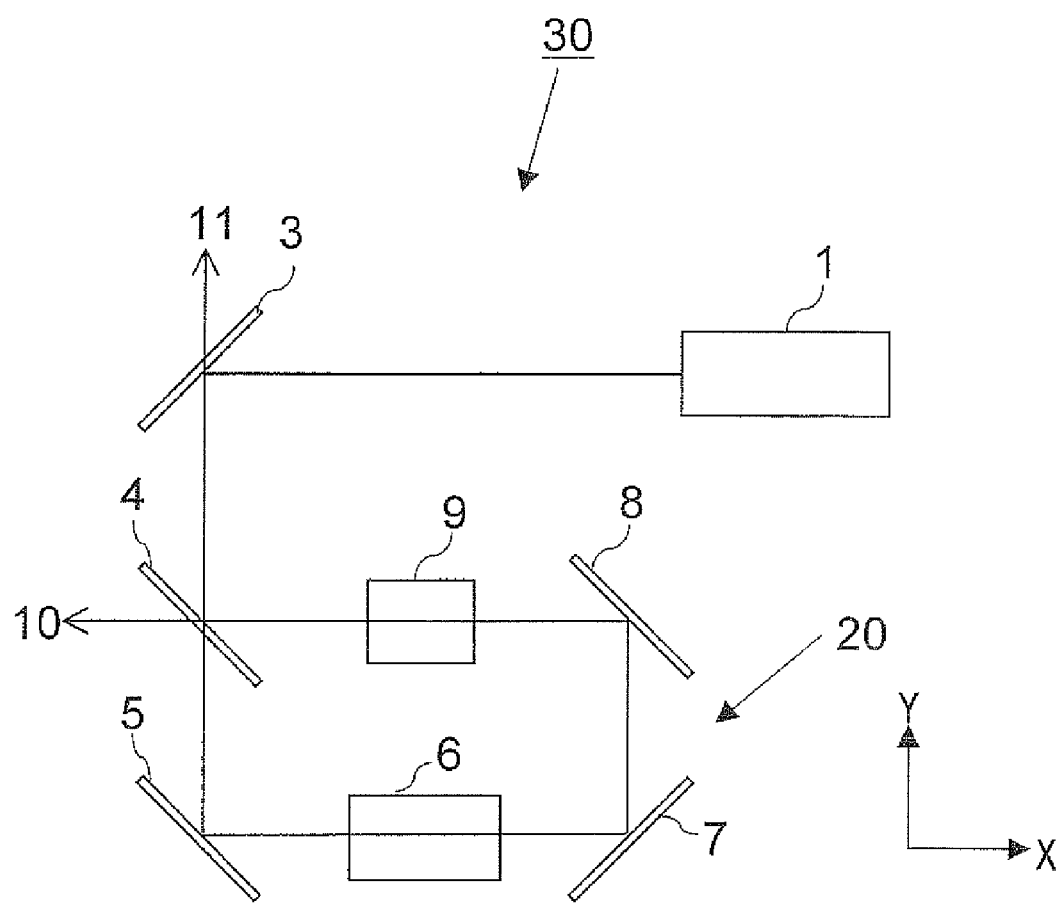
FIG. 1 is a block diagram illustrating the makeup of a quantum entanglement generating system according to a first embodiment of the present invention.

1: Light source
2, 105: Second harmonic generator
3: First mirror
4: Beam splitter
5: Second mirror
6, 122: Optical parametric amplifier
7: Third mirror 8: Fourth mirror
9. 124, 128: Dispersive medium
10, 130: First quantum entangled beam
11, 131: Second quantum entangled beam
15: Laser light source of light frequency $f_0$
20, 25, 70, 170: Ring interferometer
30, 35, 40: Quantum entanglement generating system
50, 150: Quantum entanglement generating and detecting system
60, 160: Light source part
80, 180: First homodyne detector
90, 190: Second homodyne detector
100: Pulsed laser light source
101: Light pulse
(light horizontally polarized at light frequency $f_0$)
102, 132, 138, 139: Zero-order half-wave plate for light frequency $f_0$
103, 107, 110, 113: Horizontally polarized component of light of light frequency $f_0$
104, 108, 111: Vertically polarized component of light frequency $f_0$
106: Light horizontally polarized at light frequency $2f_0$
109, 117, 219: Beam splitter for light polarized at light frequency $f_0$
112, 118: Wave plate for 2 wavelengths (half-wavelength wave plate at light frequency $f_0$, and becoming one-wavelength wave plate at light frequency $2f_0$)
114: Mirror
115: Light ray of light frequency $f_0$
116: Light ray of light frequency $2f_0$
120, 134, 213: Special beam splitter
121, 123, 203, 204, 120: Mirror (two-wavelength mirror)
125, 216: First glass plate
126, 217: Second glass plate
133, 135, 214, 215, 220: Mirror for light frequency $f_0$
136: First electro-optic crystal
137: Second electro-optic crystal
140, 141: Beam splitter for light polarized at light frequency $f_0$
142: First photodiode
143: Second photodiode
144: Third photodiode
145: Fourth photodiode
146: First RF combiner
147: Second RH combiner
148: First amplifier
149: Second amplifier
200, 202, 206, 208, 226, 227, 228, 229: Lens
205, 207, 223, 224: Red color filter
211, 212: Parallel planar glass plate
221, 222: Band-path filter
225: Quarter wave plate Best Mode for Carrying Out The Invention Explanation is hereinafter given of preferred forms of implementation of the present invention with reference to the Drawing Figures.

(First embodiment of the quantum entanglement generating system)

FIG. 1 is a block diagram illustrating in a plan view the makeup of a quantum entanglement generating system 30 according to a first embodiment of the present invention. Optical paths are shown in straight lines. According to the X- and Y-coordinates shown, an explanation of the system is given with the X-direction taken crosswise and the Y-direction taken lengthwise. The quantum entanglement generating system 30 as shown in FIG. 1 comprises a laser light source 1 and a ring interferometer 20. A beam of light of light frequency $2f_0$ emitted from the laser light source 1 impinges on the ring interferometer 20 via a first mirror 3.

Second embodiment of the quantum entanglement generating system

Figure 2:
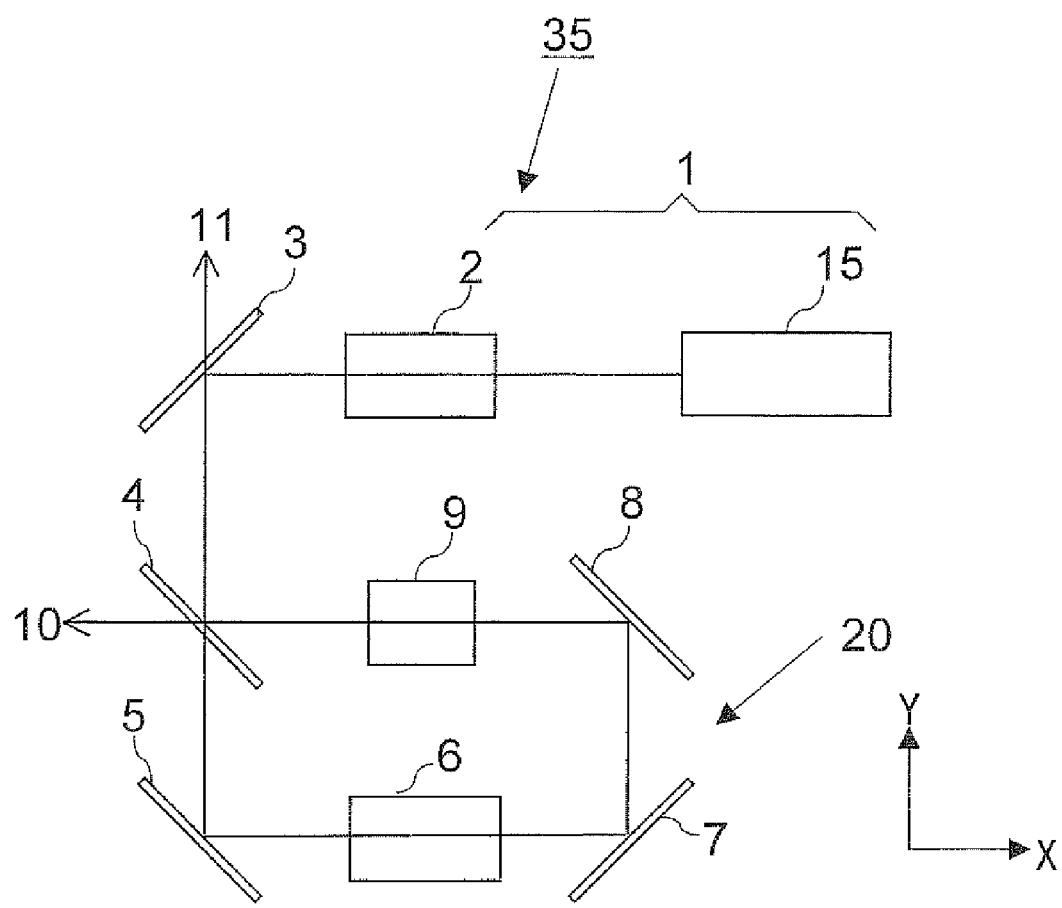
FIG. 2 is a block diagram illustrating the makeup of a quantum entanglement generating system according to a second embodiment of the present invention.

FIG. 2 is a block diagram illustrating in a plan view the makeup of a quantum entanglement generating system 35 according to a second embodiment of the present invention. Optical paths are shown in straight lines. The quantum entanglement generating system 35 shown in FIG. 2 differs from the quantum entanglement generating system 30 shown in FIG. 1 in the makeup of the laser light source 1. The laser light source 1 comprises a laser light source 15 of light frequency $f_0$ and a second harmonic generator 2, producing a beam of light of light frequency $2f_0$. The laser light emitted from the laser light source 1 and traveling straight in a direction of –X (leftwards) enters a first mirror 3 and is reflected thereat into a direction of –Y (downwards) to enter a ring interferometer 20.

The ring interferometer 20 comprises a beam splitter 4, a second mirror 5, an optical parametric amplifier 6, a third mirror 7, a fourth mirror 8 and a dispersive medium 9. The second mirror 5 is disposed in the direction of –Y (downwards) of the beam splitter 4. The third mirror 7 is disposed in a direction of X (rightwards) of the second mirror 5. Also, the fourth mirror 8 is disposed in a direction of X (rightwards) of the beam splitter 4.

In the ring interferometer 20, the beam splitter 4, and the second to fourth mirrors 5, 7 and 8 are disposed respectively at the four apexes of a quadrangle, specifically a rectangle, forming an optical path. In other words, in the ring interferometer 20 are arranged in order anticlockwise the beam splitter 4, and the first to third mirrors 5, 7 and 8 for the ring interferometer 20. The optical parametric amplifier 6 is disposed along an axis of the optical path that is formed by the second mirror 5 and the third mirror 7. The dispersive medium 9 is disposed along an axis of optical path that is formed by the beam splitter 4 and the fourth mirror 8.

The beam splitter 4 desirably has both a transmissivity and a reflectivity, of 50%, alike to both light rays of light frequency $2f_0$ and light frequency $f_0$.

The first to fourth mirrors 3, 5, 7 and 8 are each a mirror reflecting both a light beam of light frequency $2f_0$ and a light beam of light frequency $f_0$ and composed of, e.g., of a dielectric.

The optical parametric amplifier 6 is designed to convert a light beam of light frequency $2f_0$ to a light beam of light frequency $f_0$. The optical parametric amplifier 6 used may be of a crystal having a secondary nonlinear optical effect. For example, it may make use of an optical waveguide made of periodically poled $LiNbO_3$.

The dispersive medium 9 used may be of an optical glass. The optical glass may in material be borosilicate glass such as BK7. If the dispersive medium 9 is composed of an optical glass, then it may finely be moved so that its size in an optical axis of the optical glass can vary whereby changing the distance by which laser light beams pass through the glass allows controlling the relative phase between the laser light rays. The optical glass used may be a wedge-shaped glass plate. And, it may, as will be described later, be two such plates to form the dispersive medium 9. The dispersive medium 9 used may alternatively be a gas such as air loaded in a vessel, forming a so-called gas cell having windows as an inlet and an outlet for light. If the dispersive medium is constituted by a gas cell, then the pressure of the gas may be varied to allow controlling the relative phase between laser light rays passing through the gas.

The ring interferometer 20 is preferably formed on a plane. The ring interferometer 20 can be formed on a breadboard. The breadboard may also be called an optical table. The breadboard may be a plate or substrate made of a material that is stiff. With the ring interferometer 20 formed on a single breadboard, it is possible to stabilize its optical path length against variations in temperature and vibrations while simplifying the system in its apparatus makeup. The first mirror 3 may be formed on the single breadboard as well. Light from the laser light source 1 may be guided to the single breadboard via an optical fiber to make further stable the optical path length against variations in temperature and vibrations.

Explanation is next given of operations of the quantum entanglement generating system 30, 35. A light beam of light frequency $2f_0$ emitted from the laser light source 1 and passing the first mirror 3, the beam splitter 4 and the second mirror 5 constitutes a pumping light input to the optical parametric amplifier 6 to produce a first squeezed light beam of light frequency $f_0$. The first squeezed light beam traveling anticlockwise in the ring interferometer 20 is reflected by the third mirror 7 and the fourth mirror 8 and then passes through the dispersive medium 9, arriving in the beam splitter 4.

On the other hand, the laser light beam reflected by the beam splitter 4 in the X direction (rightwards) passes through the dispersive medium 9, reflects on the fourth minor 8 in the —Y direction (downwards) and reflects on the third mirror 3 in the —X direction (leftwards), then impinging on the optical parametric amplifier 6 to produce a second squeezed light beam of light frequency $f_0$. Thus, the second squeezed light beam travels clockwise in the ring resonator, arriving in the beam splitter 4 upon reflection by the second mirror 5.

The first and second squeezed light beams produced both in the ring interferometer 20 and traveling mutually contrariwise are combined, or spatially overlapped at the beam splitter 4. Then, a first quantum entangled beam 10 and a second quantum entangled beam 11 which are quantum correlated can be generated by operating the dispersive medium 9 so as to make the relative phase between the first and second squeezed light beams equal to $\pi/2$. The first quantum entangled beam 10 after passing the beam splitter 4 is emitted, as shown in FIG. 1, in the –X-direction (leftwards). The second quantum entangled beam 11 is reflected by the beam splitter 4 into the Y direction (upwards) and emitted upon passing through the first mirror 3.

When the first and second squeezed light beams are combined at the beam splitter 4, their relative phase can be controlled using the dispersive medium 9 for the following reason: in the path of travel anticlockwise in the ring interferometer 20, a light beam of light frequency $f_0$ passes through the dispersive medium 9 whereas in the path of travel clockwise in the ring interferometer 20, a light beam of light frequency $2f_0$ passes through the dispersive medium 9. To wit, the relative phase between the first and second squeezed light beams traveling in mutually contrary directions, clockwise and anticlockwise, and different in light frequency in passing through the dispersive medium 9 can be varied by varying the magnitude of dispersion.

Further, the relative phase between the first and second squeezed light beams can be set by the dispersive medium 9 to be equal to a value as desired, e.g. $\pi/2$, thereby generating the first and second quantum entangled beams 10 and 11.

According to the quantum entanglement generating system 30,35 of the first, second embodiment of the present invention, the two, i.e., first and second, squeezed light beams, not following mutually different paths but turning in mutually contrary directions in the same ring interferometer 20, have a relative phase therebetween mechanically stable.

Further, the light wavelength is converted within the ring interferometer 20. To wit, squeezed light beams of light frequency $f_0$ can be generated in the optical parametric amplifier 9 by a pumping light beam of light frequency $2f_0$ from the laser light source 1 to control the dispersive medium 9, thereby varying the relative phase between the first and second squeezed light beams. Thus, according to the quantum entanglement generating system 30, 35 of the present invention, the relative phase difference between the first and second squeezed light beams can be stably controlled in the entangle generation to combine the first and second squeezed light beams.

Third embodiment of the quantum entanglement generating system

Mention is next made of a quantum entanglement generating system 40 according to a third embodiment of the present invention.

Figure 3:
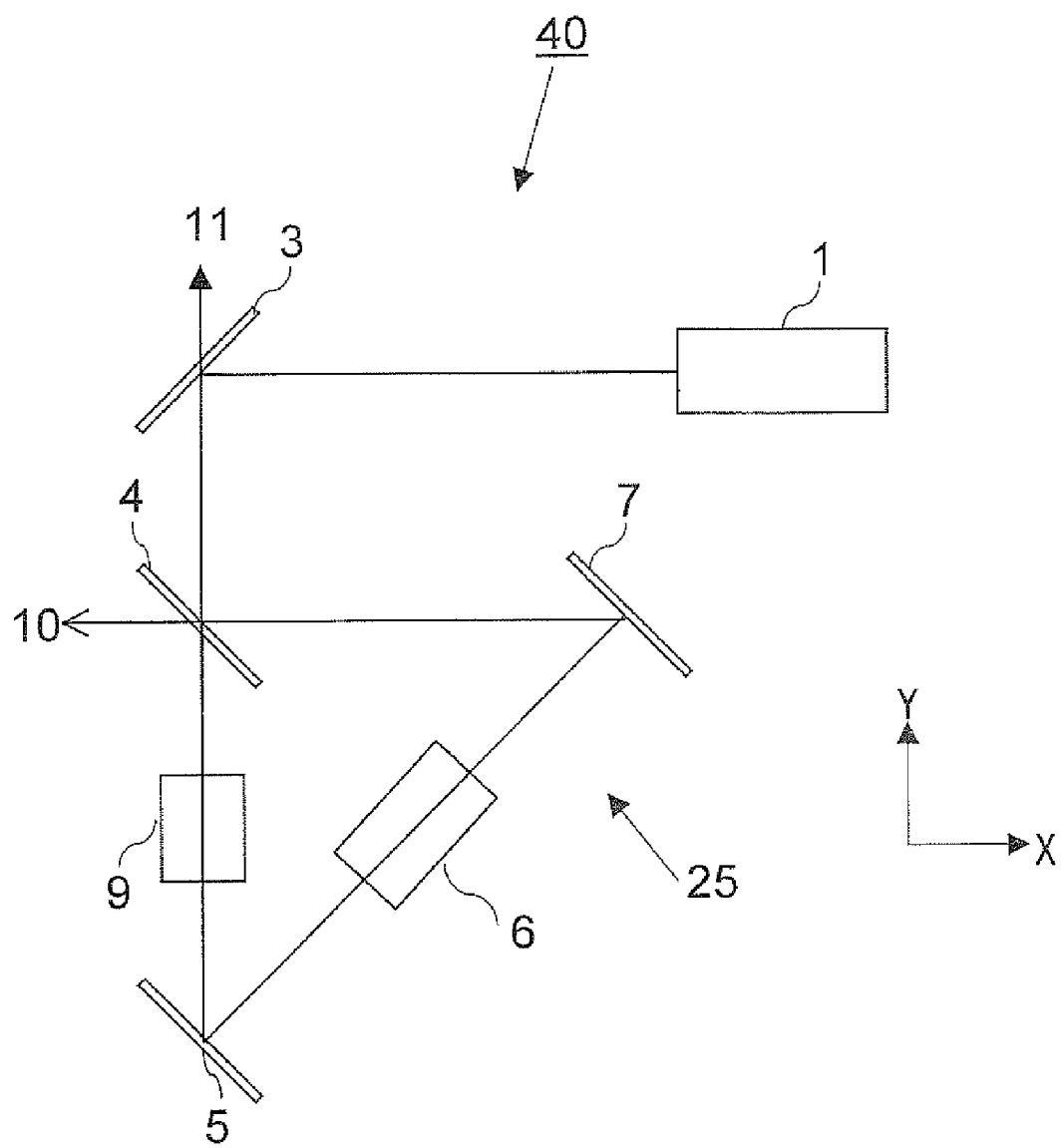
FIG. 3 is a block diagram illustrating the makeup of a quantum entanglement generating system according to a third embodiment of the present invention.

FIG. 3 is a block diagram illustrating in a plan view the makeup of the quantum entanglement generating system 40 according to the third embodiment of the present invention. Optical paths are shown in straight lines. The quantum entanglement generating system 40 shown in FIG. 2 differs from the quantum entanglement generating system 30 shown in FIG. 1 in that a ring interferometer indicated by reference character 25 is used. The makeup elsewhere is identical to that of the quantum entanglement generating system 30 whose repeated description is omitted.

The ring interferometer 25 comprises a beam splitter 4, a dispersive medium 9, a second mirror 5, an optical parametric amplifier 6 and a third mirror 7. The second mirror 5 is disposed vertically downwards (in the –Y direction) of the beam splitter 4. The third mirror 7 is disposed in the X direction (rightwards) of the beam splitter 4.

In the ring interferometer 25, the beam splitter 4, the second and third mirrors 5 and 7 are disposed respectively at the three apexes of a triangle to form an optical path. In other words, in the ring interferometer 25 are arranged in order anticlockwise the beam splitter 4, and the first and second mirrors 5 and 7 for the ring interferometer 25. The optical parametric amplifier 6 is disposed along an axis of the optical path that is formed by the second mirror 5 and the third mirror 7. The dispersive medium 9 is disposed along an axis of optical path that is formed by the beam splitter 4 and the second mirror 5.

The ring interferometer 25 as is the ring interferometer 20 is preferably formed on a substrate. With the ring interferometer 25 formed on a substrate, it is possible to stabilize its optical path length against variations in temperature and vibrations while simplifying the system in its apparatus makeup. The first mirror 3 may be formed on the same substrate as well. Light from the laser light source 1 may be guided to the substrate via an optical fiber to make further stable the optical path length against variations in temperature and vibrations.

Explanation is next given of quantum entanglement generation by the quantum entanglement generating system 40 according to the third form of implementation.

A light beam of light frequency $2f_0$ emitted from the laser light source 1 reflects on the first mirror 3 and passes through the beam splitter 4 and thereafter passes through the dispersive medium 9 and reflects on the second mirror 5, constituting a pumping light input to the optical parametric amplifier 6. The optical parametric amplifier 6 generates a first squeezed light beam of light frequency $f_0$. The first squeezed light beam of light frequency $f_0$ may be of a horizontally polarized light ray.

The first squeezed light beam traveling anticlockwise in the ring interferometer 25 is reflected by the third mirror 7, arriving in the beam splitter 4.

The light beam of light frequency $2f_0$ emitted from the laser light source 1 and reflected on the first mirror 3 is incident in the beam splitter 4. The light beam of light frequency $2f_0$ incident in the beam splitter 4 is reflected in the X-direction, reflected by the third mirror 7 downwards off to the left on the sheet and incident into the optical parametric amplifier 6 to generate a second squeezed light beam of light frequency $f_0$.

Next, the second squeezed light beam of light frequency $f_0$ after reflecting on the second mirror 5 in the Y-direction is passed through the dispersive medium 9, arriving in the beam splitter 4. Thus, the second squeezed light ray advances clockwise in the ring interferometer 25, passing through the dispersive medium 9 and arrives in the beam splitter 4.

In this way, the first and second squeezed light beams generated in the ring interferometer 25 are combined, or spatially overlapped at the beam splitter 4. Then, a first quantum entangled beam 10 and a second quantum entangled beam 11 which are quantum correlated can be generated by operating the dispersive medium 9 so as to make the relative phase between the first and second squeezed light beams equal to $\pi/2$. The first quantum entangled beam 10 after passing the beam splitter 4 is emitted, as shown in FIG. 3, in the −X-direction (leftwards). The second quantum entangled beam 11 is reflected by the beam splitter 4 into the Y direction (upwards) and emitted upon passing through the first mirror 3.

The relative phase between the first and second squeezed light rays can be set by the dispersive medium 9 to be equal to $\pi/2$, thereby generating the first and second quantum entangled beams 10 and 11.

(First Embodiment of the quantum entanglement generating and detecting system)

Mention is next made of a quantum entanglement generating and detecting system 50 according to a first embodiment of the present invention.

Figure 4:
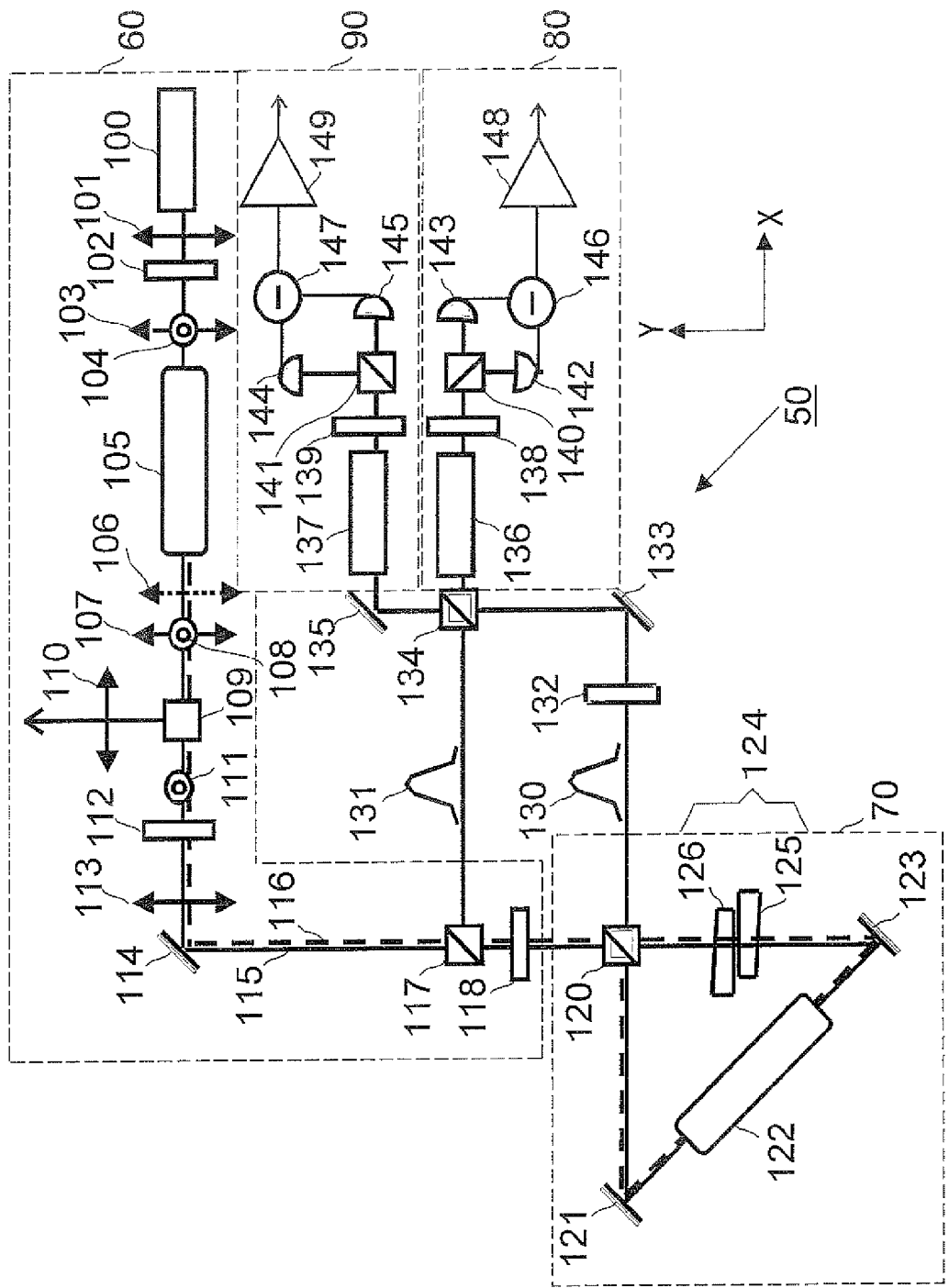
FIG. 4 is a block diagram illustrating a quantum entanglement generating and detecting system according to its first embodiment of the present invention.

FIG. 4 is a block diagram illustrating in a plan view the makeup of a quantum entanglement generating and detecting system 50 according to its first embodiment of the present invention. Optical paths are shown in straight lines. The quantum entanglement generating and detecting system 50 is made up of a means for generating a quantum entangled beam and a means for detecting a quantum entangled beam as generated. As shown in FIG. 4, the quantum entanglement generating and detecting system 50 comprises a light source part 60, a ring interferometer 70, a first homodyne detector 80 and a second homodyne detector 90.

Here, quantum entangled beams are generated by the light source part 60 and the ring interferometer 70. Signals of quantum entangled beams as generated are detected by the first and second homodyne detectors 80 and 90. In this case, the light beam from the light source part 60 constitutes local-oscillator light beams. Homodyne detection is detection by mixing a signal light beam and a local-oscillator light beam having an identical light frequency and measures the quadrature amplitude of the signal light beam.

The light source part 60 comprises a pulsed laser light source 100, and a half wave plate 102, a second harmonic generator 105, a polarizing beam splitter 109, a two-wavelength wave plate 102, a mirror 114, a polarizing beam splitter 117 and a two-wavelength wave plate 118. The laser light passing the two-wavelength wave plate 118 is made incident to the ring interferometer 70.

The pulsed laser light source 100 produces a light pulse 101 which is of light frequency $f_0$ and horizontally polarized. The horizontally polarized, pulsed light beam 101 is incident to a zero-order half-wave plate 102 for the light frequency $f_0$. The half wave plate 102 rotates a plane of polarization of the pulsed light beam 101 and converts it into an obliquely linearly polarized light ray. In other words, the plane of polarization of the pulsed light ray 101 is converted into a horizontally polarized component 103 and a vertically polarized component 104 which are injected into the second harmonic generator 105. In this case, the intensity of a local-oscillator light beam can be adjusted by the angle of rotation of the plane of polarization.

The horizontally polarized component 103 of the pulsed light ray of light frequency $f_0$ is in part converted into a pulsed laser light beam 106 which is of light frequency $2f_0$ and horizontally polarized. The pulsed laser light beam horizontally polarized 106 is passed as it is through the polarizing beam splitter 109 and the two-wavelength wave plate 112 without undergoing any change there. The second harmonic generator 105 used may be made of a crystal having a secondary nonlinear optical effect, e.g., of an optical waveguide composed of periodically-poled $LiNbO_3$.

A light beam 107 of light frequency $f_0$ as the horizontally polarized component of light not converted into light of light frequency $2f_0$ is reflected by the polarizing beam splitter 109 for light frequency $f_0$ so arranged as to transmit the vertically polarized light and becomes a horizontally polarized component 110 of light of light frequency $f_0$ which is emitted externally and not used in generating entangled beams. This is due to a disturbance of the temporal waveform of a fundamental wave that remains unconverted if the efficiency of conversion into second harmonics is high (see Non-Patent Reference 3). However, if the efficiency of conversion into second harmonics is not high, then the horizontally polarized component 110 need not necessarily be discarded and can be reused.

On the other hand, the vertically polarized component of a pulsed light beam of light frequency $f_0$ is passed through the second harmonic generator 105 without undergoing any nonlinear interaction therewith and its output vertically polarized component thus is identical in pulse width and spectrum to pulses output from the original pulsed laser light source 100. The vertically polarized component 108 of the pulsed light beam of light frequency $f_0$ passes through the polarizing beam splitter 109 and its resulting vertically polarized light beam 111 is converted by the two-wavelength wave plate 112 into a horizontally polarized light 113 of half wavelength if with light frequency $f_0$ and of one wavelength if with light frequency $2f_0$.

The mirror 114 used should be one that is high in reflectance for light frequency $2f_0$. For the mirror 114, a mirror made of a dielectric can be used. A reflectance of the mirror 114 for light frequency $f_0$ may be chosen depending on an intensity of the local-oscillator light beam as needed for the homodyne detection which will later be described. If the mirror 114 has a reflectance that is low for light frequency $f_0$, then it can be used as a filter for selectively attenuating the light frequency $f_0$.

Accordingly, the light beam emitted from the pulsed laser light source 100 comes to be a pulsed light beam 115 of light frequency $f_0$ and a pulsed light beam 116 of light frequency $2f_0$ which are both horizontally polarized on an identical optical axis. Here, the pulsed light beam 115 of light frequency $f_0$ and the pulsed light beam 116 of light frequency $2f_0$ as they are on the same optical path are also called the coaxial pulsed light beams 115 and 116 of light frequencies $f_0$ and $2f_0$, respectively.

A polarizing beam splitter 117 is arranged so as to allow a horizontally polarized component of light frequency $f_0$ to be passed therethrough. Thus, a pulsed light beam of light frequency $f_0$ is passed as it is. Next, the pulsed light beam of light frequency $f_0$ is converted by a two wavelength wave plate 118 into a vertically polarized light ray.

The ring interferometer 70 comprises a beam splitter 120 having a special function as will later be described (i.e., hereinafter, referred to as "special beam splitter"), a mirror 121, an optical parametric amplifier 122, a mirror 123 and a dispersive medium 124. In a plan view, the mirror 121 is disposed in a −X direction (leftwards) of the special beam splitter 120 and the mirror 123 is disposed in a −Y direction (downwards) of the special beam splitter 120.

In the ring interferometer 70, the special beam splitter 120 and the mirrors 121 and 123 are disposed to lie at the three apexes of a triangle. The optical parametric amplifier 122 is disposed to lie along an axis of optical path formed by the mirrors 121 and 123. The dispersive medium 124 is disposed to lie along an axis of optical path formed by the special beam splitter 120 and the mirror 123. The ring interferometer 70 as is the ring interferometer 20 is preferably formed on a breadboard or substrate. Forming the ring interferometer 70 on a breadboard or substrate allows stabilizing its optical path length against variations in temperature and vibrations while simplifying the system in its apparatus makeup.

The special beam splitter 120 has a transmissivity and a reflectance, of about 50%, equally to horizontally linearly polarized light beams of light frequency $f_0$ and light frequency $2f_0$, and has a reflectance of about 100% to a vertically linearly polarized light beam of light frequency $f_0$. A pulsed light beam 116 of light frequency $2f_0$ horizontally polarized is therefore bifurcated by the special beam splitter 120 at a proportion of about 1/1. It is then injected into the ring interferometer 70 to generate a first and a second quantum entangled beam 131 and 132 as will later be described.

The mirrors 121 and 123 are each a mirror which is of a reflectance of about 100% to both light frequencies $f_0$ and $2f_0$ and composed, e.g., of a dielectric.

The optical parametric amplifier 122 used may be made of a crystal having a secondary nonlinear optical effect and may consist of, e.g., periodically-poled $LiNbO_3$.

The dispersive medium 124 comprises a first glass plate 125 and a second glass plate 126. The first and second glass plates 125 and 126 can each be a wedged glass plate, an optical part capable of imparting a small difference in optical path length between wavelengths. An example of the wedged glass plate 125, 126 is formed with one face perpendicular to an optical axis and the other face inclined to the optical axis. The wedged glass when used may be composed of borosilicate glass such as BK7. The first or second wedged glass plate 125, 126 may be made movable perpendicular to the optical axis. The first or second wedged glass plate 125, 126 if moved perpendicular to the direction of travel of light is capable of limiting variations in beam position of the light after passing the two wedged glass plates.

In the makeup mentioned above, placing the wedged glass plates 125 and 126 contrariwise to each other in wedge orientation, i.e., with their thinner sides placed contrariwise right and left with respect to the optical axis, allows further limiting variations in the light beam position.

Further, providing both faces of the wedged glass plate 125, 126 with an anti-reflection coating to light frequency $f_0$ and light frequency $2f_0$ can impart an increased transmissivity to the wedged glass plates 125 and 126. Moving the wedged glass plate 125, 126 perpendicularly to the optical axis to vary the optical path length through the glass plates allows achieving the effect of dispersion. To wit, with the use of the first wedged plate 125 and the second wedged plate 126, by the effect that their refractive indices changes with change in light frequency, it is possible to vary the relative optical path length between the light frequency $f_0$ and light frequency $2f_0$. For example, assume that the wedged glass plates 125 and 126 are composed of BK7 and have an angle of inclination of 1 degree. If the wavelength of light of light frequency $f_0$ is 1535 nm and the wavelength of light of light frequency $2f_0$ is 767 nm, moving the wedged glass plate 125, 126 by 0.86 mm in a perpendicular direction to the optical axis causes the relative phase between light of light frequency $f_0$ and light of light frequency $2f_0$ to change by $\pi/2$. A variation then caused in relative position between beams of light of light frequency $f_0$ and of light of light frequency $2f_0$ is less than 3 nm. Also, the first and second wedged glass plates are preferably positioned so that the light beam is made incident to the first glass plate 125 perpendicularly thereto and emitted out of the second wedged glass plate 126 perpendicularly thereto. Further, the two wedged glass plates 125 and 126 are preferably disposed to be adjacent to each other as much as possible. These make it possible to minimize the variation in beam position between light of light frequency $f_0$ and light of light frequency $2f_0$.

Explanation is next given of operations of the quantum entanglement generating and detecting system according to the first form of implementation.

Of two light beams of light frequency $2f_0$ split into by the special beam splitter 120 at a ratio of about 1/1, one light beam passes anticlockwise in the ring interferometer 70, namely the mirror 121, the optical parametric amplifier 122, the mirror 123 and the dispersive medium 124 in order. The other light beam passes clockwise in the ring interferometer 70, namely the dispersive medium 124, the mirror 123, the optical parametric amplifier 122 and the mirror 121 in order.

The horizontally polarized light beam of light frequency $2f_0$ advancing anticlockwise is incident into the optical parametric amplifier 122 where the pulsed light beam of light frequency $2f_0$ acts as a pumping light for the parametric amplification to generate a horizontally polarized, squeezed light beam of light frequency $f_0$. The squeezed light beam traveling anticlockwise is reflected by the mirror 123, passes through the dispersive medium 124 and is incident again into the special beam splitter 120.

The horizontally polarized light beam of light frequency $2f_0$ advancing clockwise passes through the dispersive medium 124 and is incident into the optical parametric amplifier 122 where the pulsed light ray of light frequency $2f_0$ acts as a pumping light beam for the parametric amplification to generate a horizontally polarized, squeezed light ray of light frequency $f_0$. The squeezed light beam traveling clockwise is reflected by the mirror 121 and incident again into the special beam splitter 120.

The two squeezed light beams incident to the special beam splitter 120 and advancing contrariwise to each other, i.e., the squeezed light beam advancing clockwise and the squeezed light beam advancing anticlockwise are each a horizontally polarized light beam and can be combined in 1 to 1. The relative phase between the two squeezed light beams can be set at a value as desired by relative position of the first and second wedged glass plates in the dispersive medium 124. If relative phase difference is set to be $\pi/2$, a first and a second quantum entangled beam 130 and 131 can be generated which are quantum correlated.

The special beam splitter 120 has a transmissivity and a reflectance of 50% each to a horizontally polarized light beam of light frequency $f_0$. The quantum entangled beam generated are: a first quantum entangled beam 130 as the component reflected by the special beam splitter 120 and a second quantum entangled beam 131 as the component passing through the special beam splitter 120.

As shown, the first quantum entangled beam 130 is incident to a first homodyne detector 80 via a half wave plate 132, a mirror 133 and a special beam splitter 134. The wave plate 132 is a zero-order half-wave plate for light frequency $f_0$ and converts a horizontally, linearly polarized light beam into a vertically polarized light beam. The mirror 133 reflects the light beam of light frequency $f_0$ and is composed of, e.g., a dielectric. The special beam splitter 134 reflects the vertically polarized light beam. The first quantum entangled beam 130 is thereby converted into a vertically polarized light beam and then incident into the first homodyne detector 80.

The second quantum entangled beam 131 is converted by the two wavelength wave plate 118 into a vertically polarized light beam, reflected by the polarizing beam splitter 117, a special beam splitter 134 and a mirror 135 and incident into the second homodyne detector 90. The mirror 135 reflects the light beam of light frequency $f_0$ and is composed of, e.g., a dielectric.

Mention is made of light as a local-oscillator light beam for the first, second homodyne detector 80, 90. From the light from the light source part 60, vertically linearly polarized light beams of light frequency $f_0$ and light frequency $2f_0$ are coaxially formed and incident into the special beam splitter 120. A pulsed light beam of light frequency $2f_0$ as mentioned above is used to generate quantum entangled beams in the ring interferometer 70. On the other hand, a vertically linearly polarized light beam of light frequency $f_0$ constitutes a pulsed light beam as a local-oscillator light beam for the first and second homodyne detectors 80 and 90. Mention is made of its details below.

The vertically linearly polarized light beam of light frequency $f_0$ is reflected by the special beam splitter 120 and reflected by the mirror 121 shown disposed at its horizontally left hand side in FIG. 4, passes through the optical parametric amplifier 122, and is reflected by the mirror 123 and incident again into the special beam splitter 120. Here, the special beam splitter 120 reflects the vertically linearly polarized light beam of light frequency $f_0$. Thus, the horizontally linearly polarized light beam of light frequency $f_0$ injected into the special beam splitter 120 is reflected thereby, advancing towards the half wave plate 132 of zero order to light frequency $f_0$. Injected into the half-wave plate 132, the vertically linearly polarized light beam of light frequency $f_0$ is caused thereby to rotate by 90° its plane of polarization for the light beam of light frequency $f_0$ whereby the vertically linearly polarized light beam of light frequency $f_0$ is converted into a horizontally polarized light beam, which is in turn reflected by the mirror 133 whose reflectance is high to a light beam of light frequency $f_0$, thus arriving in the special beam splitter 134.

The special beam splitter 134 has a transmissivity and a reflectance, of about 50%, to the horizontally linearly polarized light beam of light frequency $f_0$. Therefore, the horizontally polarized light beam of light frequency $f_0$ injected into the special beam splitter 134 is split into a reflected and a transmitted light beam. The reflected light beam is incident into the first homodyne detector 80 while the transmitted light beam is incident into the second homodyne detector 90, each of them serving as a local-oscillator light beam for the homodyne detector 80, 90.

Mention is next made of the first and second homodyne detectors 80 and 90.

The first homodyne detector 80 comprises an electrooptic crystal 136, a half wave plate 138, a polarizing beam splitter 140, two photodiode 142 and 143, a RF combiner 146 and an amplifier 148. The second homodyne detector 90 like the first homodyne detector 80 comprises an electrooptic crystal 137, a half wave plate 139, a polarizing beam splitter 141, two photodiode 144 and 145, a RF combiner 147 and an amplifier 149.

Into the first homodyne detector 80 is injected the first quantum entangle beam 130 as mentioned above, i.e., are injected the vertically polarized pulse light beam of light frequency $f_0$ as a signal light irradiation and the horizontally linearly polarized pulse light as a local-oscillator light beam. Likewise, into the second homodyne detector 90 is injected the second quantum entangled beam 131 as mentioned above, i.e., are injected the vertically polarized pulse light beam of light frequency $f_0$ as a signal light irradiation and the horizontally linearly polarized pulse light as a local-oscillator light beam.

The first quantum entangled beam 130 incident into the first homodyne detector 80 is horizontally polarized while the vertically polarized and coherent pulsed light serving as the local-oscillator light beam advances on the same optical axis. To wit, the first quantum entangled beam serving as the signal light beam and the vertically polarized and coherent pulsed light serving as the local-oscillator light beam advance coaxially. Accordingly, since the first quantum entangled beam 130 and the local-oscillator light beam are made to follow an identical path, relative phase between them can be maintained quite stably.

As for the second quantum entangled beam 131 incident into the second homodyne detector 90, the quantum entangled beam 131 and the local-oscillator light beam which after their splitting at the special beam splitter 120 meet each other at the special beam splitter 134 are made to follow partially different paths. Instability arising from this can be remedied by siting the four optical components of the special beam splitter 120, the polarizing beam splitter 117, the dielectric mirror 133 and the special beam splitter 134 on a common breadboard or substrate to keep the beam height low.

In the first homodyne detector 80, it is possible to vary the relative phase between the horizontally polarized and vertically polarized components by varying the voltage applied to the electrooptic crystal 136. The half wave plate 138 of zero order to light frequency $f_0$ is disposed so as to hold its plane of polarization for the linearly polarized light beam rotated by 45°. Its state of polarization is thus held that its plane of polarization is rotated by 45° with the first quantum entangled beam 130 and the local-oscillator light beam having their planes of polarization orthogonal to each other.

Thereupon, with the polarizing beam splitter 140 for light frequency $f_0$, the first quantum entangled beam 130 and the local-oscillating light beam can be combined together substantially at a ratio of one to one. The light beam reflecting on, and the light beam passing through, the polarizing beam splitter 140, are incident to the photodiodes 142 and 143, respectively.

The RF combiner 146 furnishes as its output a difference in photo current between the two photodiodes 142 and 143 which is amplified by the amplifier 148. By measuring its output voltage, it is made possible to determine a quadrature amplitude for the first quantum entangled beam 130. The RF combiner 146 is a means for deriving a differential in output between two photodiode sensors 142 and 143. Instead of using the RF combiner 146, an anode and cathode of the two photodiodes 142 and 143 can be connected together to take out a differential in current.

As for the second homodyne detector 90 as in the first homodyne detector 80, the phase relative between the horizontally polarized component and the vertically polarized component can be varied by varying the voltage applied to the electrooptic crystal 137. The half wave plate 139 of zero order to light frequency $f_0$ is disposed so as to hold its plane of polarization for the linearly polarized light beam rotated by 45°. As a result, its state of polarization is held that its plane of polarization is rotated by 45° with the first quantum entangled beam 130 and the local-oscillator light beam having their planes of polarization orthogonal to each other.

Thereupon, with the polarizing beam splitter 141 for light frequency fo, the second quantum entangled beam 131 and the local-oscillator light beam can be combined together substantially at a ratio of one to one. The light beam reflecting on, and the light ray passing through, the polarizing beam splitter 141, are incident to the photodiodes 144 and 145, respectively.

The RF combiner 147 furnishes as its output a difference in photo current between the two photodiodes 144 and 145 which is amplified by the amplifier 149. By measuring its output voltage, it is made possible to determine a quadrature amplitude for the second quantum entangled beam 131. The RF combiner 147 is a means for deriving a differential in output between two photodiode sensors 144 and 145. Instead of using the RF combiner 147, an anode and cathode of the two photodiodes 144 and 145 can be connected together to take out a differential in current.

According to the makeup mentioned above, it is possible to generate a quantum entanglement stably by keeping stable the relative phase between two squeezed light rays. It is further possible to output a local-oscillator light beam coaxially with the quantum entanglement and to improve the stability at which the homodyne detection is achieved.

In the present form of implementation, the utilization of a degree of freedom of polarization allows a quantum entangled beam and a local-oscillator light beam for homodyne detection to be produced coaxially, thereby holding stable the relative phase between the entangled beam and the locally oscillating light ray.

(Second Embodiment of the Quantum Entanglement Generating and Detecting System)

Mention is next made of a quantum entanglement generating and detecting system 150 according to a second form of implementation thereof in accordance with the present invention.

Figure 5:
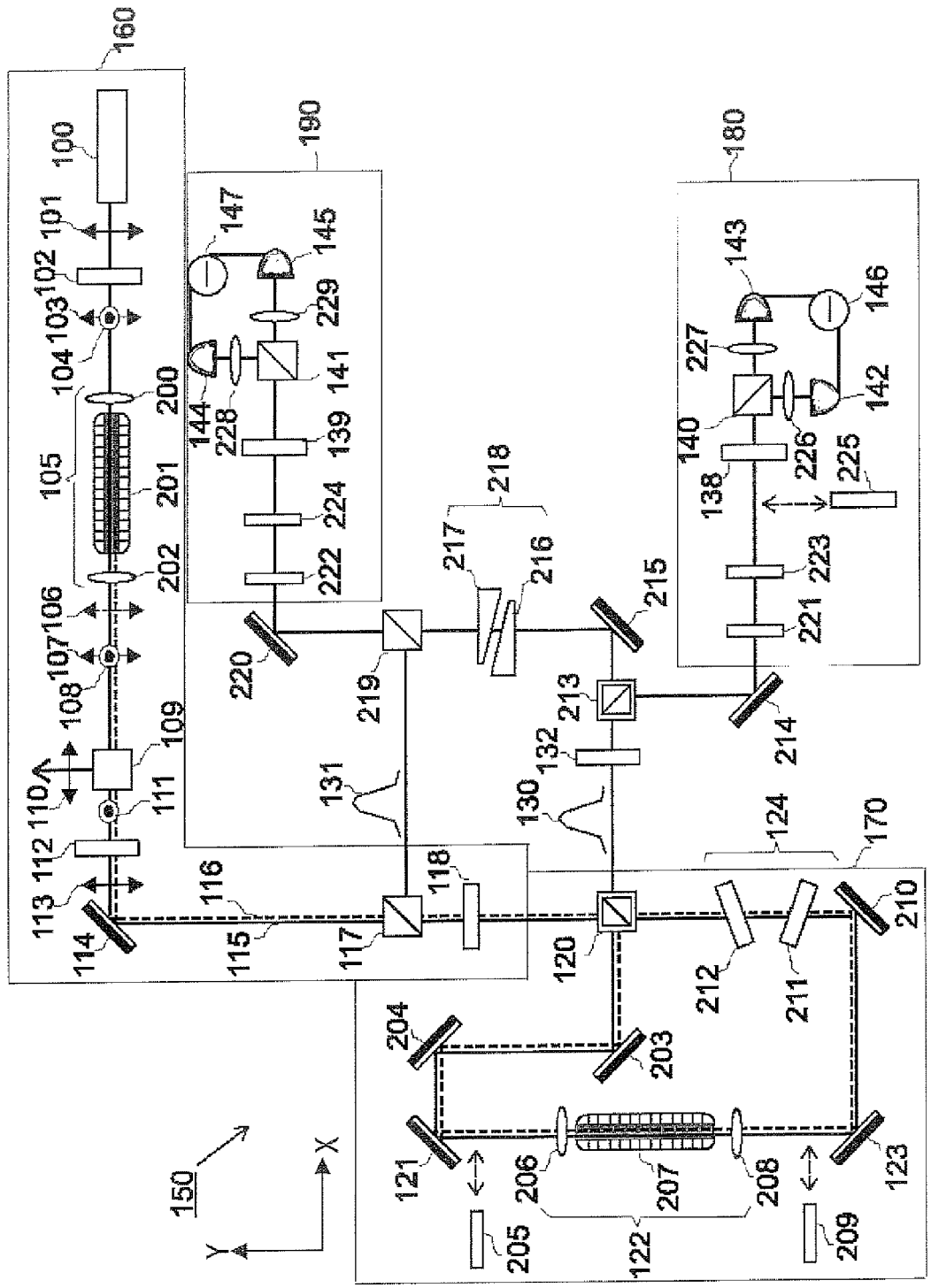
FIG. 5 is a block diagram illustrating a quantum entanglement generating and detecting system according to its second embodiment of the present invention.

FIG. 5 is a block diagram illustrating in a plan view the makeup of the quantum entanglement generating and detecting system 50 according to its first form of implementation in accordance with the present invention. Optical paths are shown in straight lines. As shown in FIG. 5, the quantum entanglement generating and detecting system 150 is made up of a generating means for generating quantum entangled beams and a detecting means for detecting quantum entangled beams generated. The generating means comprises a light source part 160, a ring interferometer 170, and the detecting means comprises a first homodyne detector 180 and a second homodyne detector 190.

The light source part 160 differs from the light source part 60 in the quantum entanglement generating and detecting system 50 according to the first form of implementation in that the second harmonic generator 105 differs. The second harmonic generator 105 here comprises an optical waveguide 201 constituting a second harmonic generator, and lenses 200 and 202 constituting the condensing means and disposed closer to the pulsed laser light source 100 and disposed at the second harmonic emission side, respectively. To wit, the difference is that the optical waveguide 201 is disposed between the lenses 200 and 202. The optical waveguide 201 for use may be an optical waveguide composed of $LiNbO_3$ having MgO added thereto and having its polarization periodically inverted. The lenses 200 and 202 used may be each a convex lens. Light condensing from the pulsed laser light source 100 into the optical waveguide 201 can be achieved efficiently by the convex lens 200 Likewise, the second harmonic produced from the optical waveguide 201 can be efficiently emitted by using the lens 202. The other makeup components in the light source part 60 are identical to those in the quantum entanglement generating and detecting system 50 and their repeated description here is omitted.

The ring interferometer 170 in the quantum entanglement generating and detecting system 150 according to the second form of implementation is made up identically to the ring interferometer 70 in the quantum entanglement generating and detecting system 70 according to the second form of implementation in that it includes the special beam splitter 120, but differ in that it involves a different optical path shape (a first difference), a different structure of the optical parametric amplifier 122 (a second difference), a different structure of the dispersive medium 124 (a third difference) and a structure that makes it possible for red color filters 205 and 209 to be inserted (a fourth difference). These differences will be described below in detail with reference to FIG. 5.

Mention is first made of the optical path shape constituting the first difference.

The ring interferometer 170 as shown in FIG. 5 comprises the special beam splitter 120, mirrors 203 and 204, the mirror 121, the optical parametric amplifier 122, the mirror 123, a mirror 210 and the dispersive medium 124. The mirror 203 is disposed in a plan view in the −X direction of the special beam splitter 120, the mirror 204 in the Y direction of the mirror 3, the mirror 121 in the −X direction of the mirror 204, the mirror 123 in the −Y direction of the optical parametric amplifier 122, and the mirror 210 in the X direction of the mirror 123 and in the −Y direction of the special beam splitter 120.

Here, the mirrors 203, 204 and 210 as are the mirrors 121 and 123 are each a mirror which has a reflectance of about 100% to light frequencies $f_0$ and $2f_0$ and consists, e.g., of a dielectric.

In the ring interferometer 170, there are disposed the beam splitter 120 and the mirrors 203, 204, 121, 123, 210 to lie at the six apexes of a hexagon or hex-angle, respectively. The ring interferometer 170 in the second form of implementation differs from the ring interferometer 70 in the first form of implementation in that it has the hexagonal or hex-angular optical path while the ring interferometer 70 has the triangular optical path. This notwithstanding, the ring interferometers 70 and 170 operate basically in the same way.

Mention is next made of the optical parametric amplifier 122 constituting the second difference.

It differs from the ring interferometer 70 according to the first form of implementation in that lenses 206 and 208 are disposed, respectively, in front and rear of the optical waveguide 207 in the direction of its optical axis. The optical parametric amplifier 122 in the ring interferometer 170 is disposed along the axis of an optical path formed between the mirrors 121 and 123 and is made up of the two lenses 206 and 208 and the optical waveguide 207 disposed between them and consisting of MgO added $LiNbO_3$ and having its polarization periodically inverted. The lenses 206 and 208 may each be a convex lens. The light beam of light frequency $f_0$ and the light beam of light frequency $2f_0$ encircling in the ring interferometer 170 and in passing the optical waveguide 207 are efficiently injected into and emitted from the optical waveguide 207 through the two lenses 206 and 208.

In comparison with the ring interferometer 70 according to the first form of implementation, the mirrors 203, 204 and 210 are added to the ring interferometer 170 according to this form of implementation. With the two or more lenses disposed at both sides of the optical waveguide, respectively, it is possible to optimize the efficiency of injection of light pulses into the optical waveguide 207 from its both sides. Also, by equalizing distances between the optical waveguide 207 and the special beam splitter 120 for the light rays traveling clockwise and anticlockwise in the ring interferometer 170, the concurrence in spatial mode between squeezed light beams formed in the clockwise and anticlockwise directions can be enhanced.

Mention is made of the dispersive medium 124 constituting the third difference.

As the dispersive medium 124 disposed in the ring interferometer 170, use is made of two planar glass plates 211 and 212, each having two planes or flat surfaces disposed parallel to each other (such a glass plate is hereinafter referred to as a "parallel planar glass"). This is a distinction from the ring interferometer 70 according to the first form of implementation in which the two wedged glass plates 125 and 126 are used.

The parallel planar glass plates 211 and 212 are disposed so as to incline with an angle of inclination to, and symmetrically with respect to a plane perpendicular to, the optical axis. The angle of inclination to the optical axis is preferably varied while holding its equality between the two parallel planar glasses 211 and 212. If so, a variation in the angle of inclination of the parallel planar glass plate 211, 212 will keep the optical axis of a light beam after passing through the parallel planar glass plates 211 and 212 unaltered in position. Varying the angle of inclination of the parallel planar glass plate 211, 212 to the plane perpendicular to the optical axis causes the optical path for light to pass between the parallel planar glass plates 211 and 212 to vary in length; it is thus possible to achieve the effect of dispersion as with the two wedged glass plates. To wit, with the use of the first and second parallel planar glass plates 211 and 212, by the effect that their refractivity changes with change in light frequency, it is possible to vary the relative optical path length between the light frequency $f_0$ and light frequency $2f_0$.

Here, the parallel planar plate 211, 212 used may be composed of borosilicate glass such as BK7. Further, both surfaces of the parallel planar glass plate 211, 212 are preferably provided with a coating non-reflective to light frequency $f_0$ and light frequency $2f_0$ to impart thereto an increased transmissivity for a light beam of light frequency $f_0$ and a light beam of light frequency $2f_0$.

For example, let it be assumed that the parallel planar glass plate 211, 212 is composed of BK7 and has a thickness of 5 mm. If the wavelength of light of light frequency $f_0$ is 1535 nm and the wavelength of light of light frequency $2f_0$ is 762 nm, turning the parallel planar glass plates 211 and 212 symmetrically from 0° to 4.8° causes the relative phase between light of light frequency $f_0$ and light of light frequency $2f_0$ to change by $\pi/2$.

Mention is next made of the red color filters 205 and 209 constituting the fourth difference.

The ring interferometer 170 is provided on its optical axis with the two red color filters 205 and 209 removably, of which as shown the red color filter 205 is disposed on the optical axis between the mirror 121 and the lens 206 and the red color filter 208 is disposed on the optical axis between the lens 209 and the mirror 123. The red color filter 205, 209 is capable in property of transmitting substantially 100% of light frequency $f_0$ and absorbing substantially 100% of light frequency $2f_0$. Disposing the red color filters 205 and 209 as described above, viz. in front and rear of the optical waveguide 207 sandwiched between the two lenses prevents the light beam of light frequency $2f_0$ from entering the optical waveguide 207. Since the pulsed light beam of light frequency $2f_0$ for acting as a pumping light beam is thus removed by the red color filters 205 and 206, no squeezed horizontally polarized light ray of light frequency $f_0$ is generated in and from the optical waveguide 207 constituting the optical parametric amplifier 122. It follows, therefore, that no first or second quantum entangled beam 130, 131 is generated from the ring interferometer 170.

If the red color filter 205, 209 is inserted to lie on the optical axis, then no squeezed light beam but only a local-oscillator light beam of light frequency $f_0$ as a signal light beam is incident into the homodyne detector 180, 190. The homodyne detector 180, 190 thus operates with no signal incident thereto, viz., as a detector of shot noise level.

The quantum entanglement generating and detecting system 150 according to the second form of implementation in which the light source part 160 and the ring interferometer 170 are like those in the quantum entanglement generating and detecting system 50 according to the first form of implementation except that it can incorporate a red color filter 205, 209, similarly generates a first and a second quantum entangled beam 130 and 131.

Mention is made of an optical path for a first quantum entangled beam 130 to propagate into the first homodyne detector 180.

As shown, a first quantum entangled beam 130 of horizontally linearly polarized light passes the half wave plate 132, a special beam splitter 213 and a mirror 214 in order and is injected into the first homodyne detector 180. The half wave plate 132 is a wave plate of zero order to light frequency $f_0$ and converts a horizontally linearly polarized light beam to a vertically polarized light beam at light frequency $f_0$. The special beam splitter 213 reflects the vertically polarized light ray and this light beam of light frequency $f_0$ is reflected by a mirror 214. The mirror 214 is composed of, e.g., a dielectric.

Thus, the first quantum entangled beam 130 after it is converted to the vertically polarized light beam is injected into the first homodyne detector 180. This is as it is in the quantum entanglement generating and detecting system 50 according to the first form of implementation.

Mention is made of an optical path for a second quantum entangled beam 131 to propagate into the second homodyne detector 190.

The second quantum entangled beam 131 is converted by the two wavelength wave plate 118 into a vertically polarized light beam, passed through the polarizing beam splitter 117 and a polarizing beam splitter 219, reflected by a mirror 220 and injected into the second homodyne detector 190. The mirror 220 is composed of, e.g., a dielectric and reflects a light ray of light frequency $f_0$.

Thus, the second quantum entangled beam 131 after it is converted to the vertically polarized light is injected into the second homodyne detector 190. This is as it is in the quantum entanglement generating and detecting system 50 according to the first form of implementation.

Mention is next made of an optical path for a local-oscillator light beam to propagate.

The vertically polarized light ray of light frequency $f_0$ from the light source 160 is reflected on the special beam splitter 120 and after encircling the ring interferometer 170 is reflected again on the special beam splitter 120. The reflected pulsed light beam of light frequency $f_0$ vertically polarized is converted by the half wave plate 132 and split by the special beam splitter 213 into a reflected light beam of horizontal polarization and a transmitted light beam of horizontal polarization at a ratio in intensity of 50 to 50. Horizontally polarized, the pulsed light beam of light frequency $f_0$ reflected by the special beam splitter 213 is reflected by the mirror 214 and injected into the first homodyne detector 180 to provide the local-oscillator light beam.

On the other hand, the pulsed light ray beam horizontal polarization passed through the special beam splitter 213 passes through the dispersive medium 218 and the polarizing beam splitter 219 and reflects on the mirror 220 and thereafter is injected into the second homodyne detector 190 for use as the local-oscillator light beam.

In the homodyne detectors 80 and 90 of the quantum entanglement generating and detecting system 50 according to the first form of implementation, the difference in phase between the first quantum entangled beam 130 horizontally polarized and the local-oscillator light beam vertically polarized is adjusted by the first electrooptic crystal 136. Likewise, the difference in phase between the second quantum entangled beam 131 horizontally polarized and the local-oscillator light beam vertically polarized is adjusted by the second electrooptic crystal 137.

Of the homodyne detector 180, 190 in the quantum entanglement generating and detecting system 150 according to the second form of implementation, a structure is adopted which differs from that of the homodyne detector 80, 90 in the quantum entanglement generating and detecting system 50 according to the first form of implementation.

The first homodyne detector 180 is made up of a bandpass filter 221, a red color filter 223, a quarter wave plate 225 that can be removably inserted on an optical axis, a half wave plate 138, a polarizing beam splitter 144, a lens 226 for condensing the light beam reflected by the polarizing beam splitter 140, a photodiode 142 for detecting the condensed, reflected light beam, a lens 227 for condensing the light ray transmitted through the polarizing beam splitter 140, a photodiode 143 for detecting the condensed, transmitted light beam and a RF combiner 146 that provides an output representing a difference in photocurrent between the light beams detected by the two photodiodes 142 and 143. The output furnished from the RF combiner 146 may, as in the homodyne detector 80, be amplified by an amplifier 148 not shown.

The first homodyne detector 180 is identical in makeup to the first homodyne detector 80 except that on the optical axis for the mirror 214 and the half wave plate 138 there are arranged the bandpass filter 221, the red color filter 223, the quarter wave plate 225 that can be removably disposed on the optical axis, and the lenses 226 and 227.

The bandpass filter 221 has a light transmission property which is the highest in transmissivity to light frequency $f_0$. Consequently, components of the light frequency not interfering with the local-oscillator light beam of light frequency $f_0$ are removed as much as possible.

The red color filter 223 as is the red color filter 205, 209 used in the ring interferometer 170 is of a transmissivity of about 100%, having the optical property with a transmissivity of nearly 0 to light frequency $f_0$. The red color filter 223 thus prevents light pulses of light frequency $2f_0$ from entering the photodiode 142, 143.

If the quarter wave plate 225 is inserted in the optical path, then the difference in phase between the horizontally and vertically polarized components of light pulses of light frequency $f_0$ can be shifted by $\pi/2$. Disposing the quarter wave plate 225 in the measurement allows the phase difference between the first quantum entangled beam 130 of vertical polarization and the local-oscillator light beam of horizontal polarization to be shifted from that if the quarter wave plate 225 is not used. It is thus possible to adjust the phase difference between a first quantum entangled beam 130 of vertical polarization and a local-oscillating light beam of horizontal polarization here as well as in the first homodyne detector 80 with the electrooptic crystal 137.

The lens 226, 227 disposed between the polarizing beam splitter 140 and the photodiode 142, 143 is provided for condensing, which may be, e.g., a convex lens.

The functions of the polarizing beam splitter 140, the photodiodes 142 and 143 and the RF combiner 146 which are shown disposed at the right hand side of the half wave plate 138 in the first homodyne detector 180 are identical to those in the first homodyne detector 80, and their repeated explanation is omitted.

Including the bandpass filter 221, the red color filter 223 and the condensing lens 226, 227 in the first homodyne detector 180 increases its sensitivity from that of the first homodyne detector 80.

Mention is next made of the second homodyne detector 190.

The second homodyne detector 190 is made up of a bandpass filter 222, a red color filter 224, a half wave plate 139, a polarizing beam splitter 141, a lens 226 for condensing the light beam reflected by the polarizing beam splitter 141, a photodiode 144 for detecting the condensed, reflected light beam, a lens 227 for condensing the light beam transmitted through the polarizing beam splitter 141, a photodiode 145 for detecting the condensed, transmitted light beam and a RF combiner 147 that provides an output representing a difference in photocurrent between the light beams detected by the two photodiodes 144 and 145. The output furnished from the RF combiner 147 may, as in the homodyne detector 90, be amplified by an amplifier 149 not shown.

The second homodyne detector 190 differs from the first homodyne detector 180 in that there is omitted a quarter wave plate 225 that can be removable disposed on the optical axis. To wits, a dispersive medium 218 is used in lieu of the quarter wave plate 225 in the first homodyne detector 180. The dispersive medium 218 is disposed on an optical axis between the beam splitter 219 and the mirror 215 reflecting horizontally polarized light pulses transmitted through the special beam splitter 213 as mentioned before.

The dispersive medium 218 comprises a pair of glass plates 216 and 217. The two glass plates 216 and 217 used may each be a wedged glass plate as an optical component that is capable of imparting a small difference in optical path length between wavelengths. As mentioned before, the wedged glass plates 216 and 217 are such that the glass plate 216 or glass plate 217 can be moved in a direction perpendicular to the optical axis. Moving the glass plate 216 or 217 perpendicularly to the optical axis allows the difference in phase between the second quantum entangled beam 131 and the local-oscillator light beam to be varied in the second homodyne detector 190.

Including the bandpass filter 222, the red color filter 224 and the condensing lens 228, 229 in the second homodyne detector 190 as in the first homodyne detector 180 increases its sensitivity from that of the second homodyne detector 90.

(Criterion for Judging an Entanglement)

Mention is next made of the criterion for judging an entanglement of a first and a second entangled beam 130,131.

Let it be assumed that the quadrature amplitudes of a first and a second entangled beam 130,131 are $X_a(\phi_a)$, $X_b(\phi_b)$, respectively, where $\phi_a$ and $\phi_b$ represent differences in phase between the first and second quantum entangled beams 130 and 131 and their corresponding local-oscillator light beams, respectively.

Assume, also, that the quadrature amplitudes in two vacuum states are represented by $X_{a,\,vac}$ and $X_{b,\,vac}$, respectively.

A sufficient conditions for generated states to be entangled is expressed by equation (1) below (see Non-Patent Reference 4).

[Formula 1]

$$\langle\Delta^2(X_a(\phi_{a1})+X_b(\phi_{b1}))\rangle+\langle\Delta^2(X_a(\phi_{a2})-X_b(\phi_{b2}))\rangle<\langle\Delta^2(X_{a,\,vac}+X_{b,\,vac})\rangle+\langle\Delta^2(X_{a,\,vac}-X_{b,\,vac})\rangle=2\langle\Delta^2 X_{a,\,vac}\rangle+2\langle\Delta^2 X_{b,\,vac}\rangle=1 \quad (1)$$

where $\phi_{a1}$, $\phi_{a2}$, $\phi_{b1}$ and $\phi_{b2}$ need to satisfy relations: $\phi_{a2}-\phi_{a1}=\pi/2$ and $\phi_{b2}-\phi_{b1}=\pi/2$.

If the first and second (assumptively) entangled beams 130 and 131 generated satisfy inequality (1) above, then it is proven that they are actually entangled.

Since the first entangled beam 130 and the local-oscillator light beam in the homodyne detector 180 are coaxial, $\phi_a$ is fixed at a certain specific value. Assuming here that the phase difference in the absence of the quarter wave plate 225 is defined as $\phi_a=\phi_{a1}$, the phase difference in the presence of the quarter wave plate 225 inserted becomes: $\phi_a=\phi_{a2}=\phi_{a1}+\pi/2$. $\phi_b$ can be varied to a value as desired by way of the dispersive medium 218.

In the measurement procedure, $X_a(\phi_{a1})$ and $X_b(\phi_b)$ are measured by the homodyne detectors 180 and 190, respectively, while $\phi_b$ is being discontinuously scanned in the absence of the quarter wave plate 225 on the optical axis.

Next, the quarter wave plate 225 is placed and $X_a(\phi_{a2})$ and $X_b(\phi_b)$ are measured while $\phi_b$ is being discontinuously scanned. Next, the red color filters 205 and 209 are placed into the ring interferometer 170. the homodyne detectors 180 and 190 are irradiated only with the local-oscillator light beam, and $X_{a,\,vac}$ and $X_{b,\,vac}$ are measured.

From $X_a(\phi_{a1})$, $X_b(\phi_b)$, $X_a(\phi_{a2})$, $X_b(\phi_b)$, $X_{a,\,vac}$ and $X_{b,\,vac}$ thus found, values for equation (2) below can be obtained.

[Formula 2]

$$\langle\Delta^2(X_{a,\,vac}+X_{b,\,vac})\rangle+\langle\Delta^2(X_{a,\,vac}-X_{b,\,vac})\rangle=2\langle\Delta^2 X_{a,\,vac}\rangle+2\langle\Delta^2 X_{b,\,vac}\rangle \quad (2)$$

Example of Measurement in Second Embodiment Quantum Entanglement Generating and detecting System Mention is made of the prime part in the makeup of the quantum entanglement generating and detection system 150.

As the pulsed laser light source 100, use was made of a passively Q-switched erbium (Er) doped glass laser (Tango laser made by Cobolt AB) providing a pulsed laser light beam of a wavelength of 1535 nm, a pulse duration of 3.7 ns and a pulse repetition rate of 2.7 kHz. As the second harmonic generator 105 was used an optical waveguide 201 consisting of MgO added $LiNbO_3$ and having its polarization periodically inverted. Likewise, an optical waveguide 207 consisting of MgO added $LiNbO_3$ and having its polarization periodically inverted was used to form the optical parametric amplifier 122 in the ring interferometer 170. Thus, the light frequency $f_0$ corresponds to the wavelength of 1535 nm and the light frequency $2f_0$ to the wavelength of about 767 nm.

First and second quantum entangled beams 130 and 131 were generated by the quantum entanglement generating and detecting system 150 and their respective quadrature amplitudes were measured by the first and second homodyne detectors 180 and 190. The procedure described above in connection with the criterion for judging the entanglement was followed to determine the quadrature amplitudes of the first and second quantum entangled beams: $X_a(\phi_a)$ and $X_b(\phi_b)$, $\phi_a$, $\phi_b$, and their quadrature amplitudes in two vacuum states: $X_{a,\,vac}$ and $X_{b,\,vac}$.

Mention is next made of results obtained in the measurement above.

Figure 6:
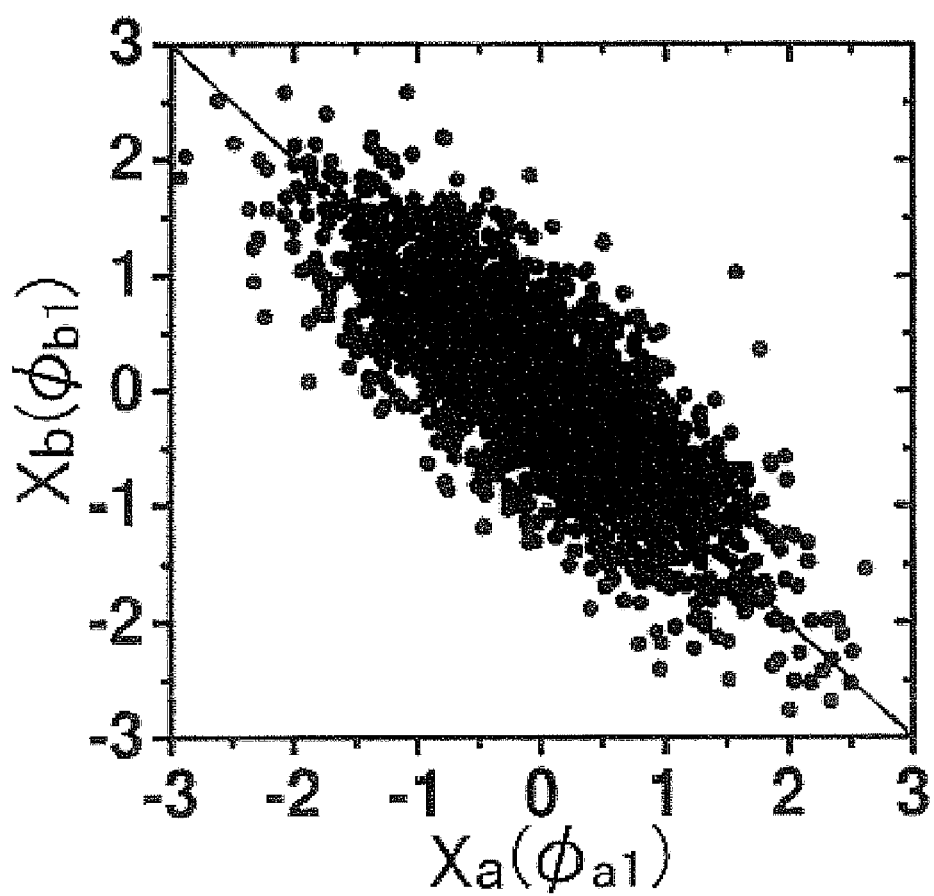
FIG. 6 is a diagram illustrating scatter plots of $X_a(\phi_{a1})$ and $X_b(\phi_{b1})$ in a phase $(\phi_b=\phi_{b1})$ in which $\langle\Delta^2(X_a(\phi_{a1})+X_b(\phi_b))\rangle$ becomes the minimum.

FIG. 6 is a diagram illustrating scatter plots of $X_a(\phi_{a1})$ and $X_b(\phi_b)$ in a phase ($\phi_b=\phi_{b1}$) in which $\langle\Delta^2(X_a(\phi_{a1})+X_b(\phi_b))\rangle$ becomes the minimum.

As is apparent from FIG. 6, it is seen that $X_a(\phi_{a1})$ and $X_b(\phi_{b1})$ have a correlation of sum; they yielded the value: $\langle\Delta^2(X_a(\phi_{a1})+X_b(\phi_{b1}))\rangle=0.31$. This value in turn yields −2.0 dB for a vacuum noise.

Figure 7:
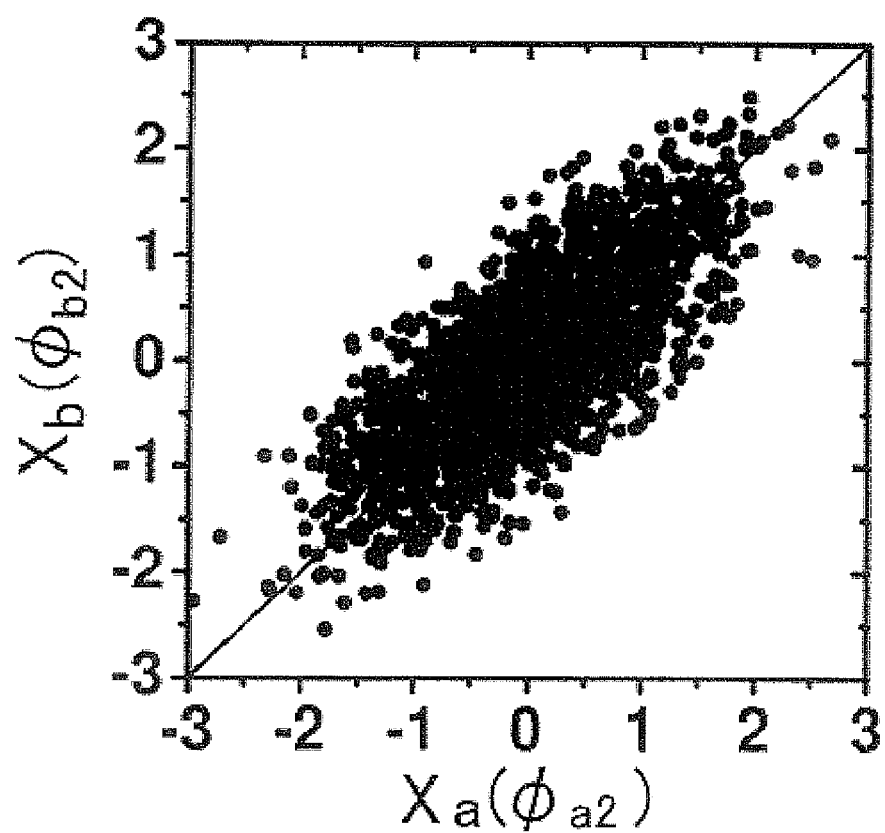
FIG. 7 is a diagram illustrating scatter plots of $X_a(\phi_{a2})$ and $X_b(\phi_{b2})$ in a phase $(\phi_b=\phi_{b1})$ which satisfies $\phi_b=\phi_{b2}=\phi_{b1}+\pi/2$.

FIG. 7 is a diagram illustrating scatter plots of $X_a(\phi_{a2})$ and $X_b(\phi_{b2})$ in a phase ($\phi_b=\phi_{b1}$) which satisfies $\phi_b=\phi_{b2}=\phi_{b1}+\pi/2$.

As is apparent from FIG. 7, it is seen that $X_a(\phi_{a2})$ and $X_b(\phi_{b2})$ have a correlation of difference; they yielded the value: $\langle\Delta^2(X_a(\phi_{a2})-X_b(\phi_{b2}))\rangle=0.33$. This value in turn yields −1.9 dB for a vacuum noise.

Figure 8:
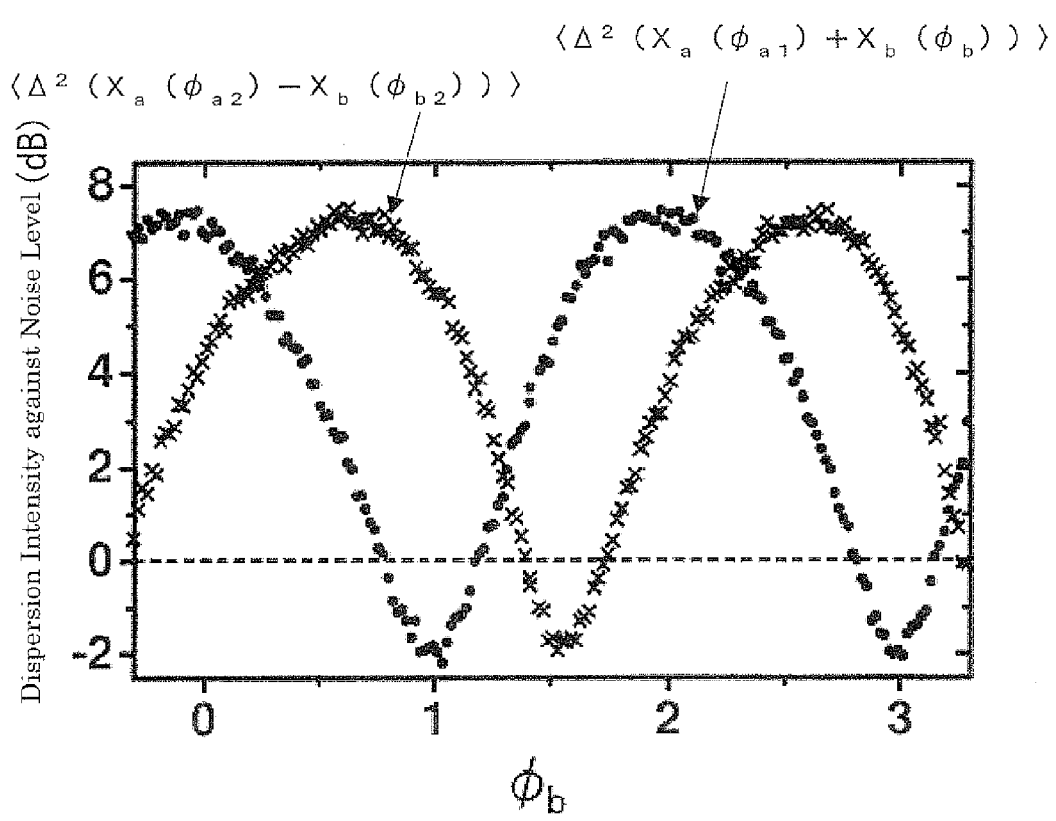
FIG. 8 is a graph illustrating dependency on $\phi$ of the dispersion intensity of sum of and difference between a first quantum entangled beam and a second quantum entangled beam, computed from the $X_a(\phi_a)$ and $X_b(\phi_b)$ measured.

FIG. 8 is a graph illustrating dependency on $\phi_b$ of the variance of sum of and difference between a first quantum entangled beam and a second quantum entangled beam, computed from the $X_a(\phi_a)$ and $X_b(\phi_b)$ measured. In FIG. 8, the abscissa axis represents $\phi_b$ ($\pi$ radian) and the ordinate axis represents the magnitude of variance (dB) in comparison with the corresponding vacuum noise. In the graph, marks of black circle (●) and marks of small crosses (×) correspond to $\langle\Delta^2(X_a(\phi_{a1})+X_b(\phi_b))\rangle$ and $\langle\Delta^2(X_a(\phi_{a2})-X_b(\phi_b))\rangle$, respectively. To wits, the circled data represent scatters of the sum computed from the measured $X_a(\phi_{a1})$ and $X_b(\phi_b)$. And, the crossed data represent scatters of the difference computed from the measured $X_a(\phi_{a2})$ and $X_b(\phi_b)$.

As is apparent from FIG. 8, it is seen that $\langle\Delta^2(X_a(\phi_{a1})+X_b(\phi_b))\rangle$ becomes the minimum when $\phi_b$ is $\pi$ radian and $3\pi$ radian and the maximum when $\phi_b$ is $2\pi$ radian. It is also seen that $\langle\Delta^2(X_a(\phi_{a2})-X_b(\phi_b))\rangle$ becomes the minimum when $\phi_b$ is about $1.6\pi$ radian and the maximum when $\phi_b$ is about $2.7\pi$ radian.

Computing the equation (1) from the values obtained for $\langle\Delta^2(X_a(\phi_{a1})+X_b(\phi_b))\rangle$ and $\langle\Delta^2(X_a(\phi_{a2})-X_b(\phi_{b2}))\rangle$ yields the inequity (3) shown below.

[Formula 3]

$$\langle\Delta^2(X_a(\phi_{a1})+X_b(\phi_{b1}))\rangle+\langle\Delta^2(X_a(\phi_{a2})-X_b(\phi_{b2}))\rangle=0.64<1 \quad (3)$$

That is to say, since the value of the left side of the equation (3) is 0.64 which is smaller than 1, a sufficient condition for the entanglement is evidently satisfied. To wits, it has been ascertained that the first quantum entangled beam 130 and the second quantum entangled beam 131 are actually entangle.

INDUSTRIAL APPLICABILITY

A quantum entanglement generated in a quantum entanglement generating system and a quantum entanglement generating and detecting system can be utilized to achieve absolutely safe communications as well as computation processing at a speed incommensurably higher than heretofore.

The invention claimed is:
1. A quantum entanglement generating system comprising:
a laser light source for producing a light beam of light frequency $2f_0$;

a ring interferometer comprising a beam splitter and a plurality of mirrors, the beam splitter and the minors forming an optical path in the form of a ring;

an optical parametric amplifier inserted in the optical path of the ring interferometer for producing a light beam of light frequency $f_0$ upon receiving a light beam of light frequency $2f_0$ incident into the optical parametric amplifier; and a dispersive medium inserted in the optical path of the ring interferometer, wherein the light beam of light frequency $2f_0$ from the laser light source injects into the beam splitter, the beam splitter splits the light beam of light frequency $2f_0$ into two light beams travelling mutually contrariwise in direction of advance in the ring interferometer, the two light beams injected into the optical parametric amplifier to generate a first and a second squeezed light beams traveling mutually contrariwise in direction of advance in the ring interferometer, the dispersive medium adjusts the relative phase between the first and second squeezed light beams at a selected value, and the beam splitter combines the first and second squeezed light beams, thereby generating quantum entangled beams.

2. A quantum entanglement generating system as set forth in claim 1 wherein the optical path of the ring interferometer is formed of the sides of a polygon of triangle or more angle in the ring interferometer in which the beam splitter is disposed at an apex of the polygon with the minors lying at its remaining apexes, respectively.

3. A quantum entanglement generating system as set forth in claim 1 wherein the optical path of the ring interferometer is a triangular optical path in which the beam splitter and a first and a second of the mirrors are arranged in turn anticlockwise, and wherein the dispersive medium is disposed in the optical path between the beam splitter and the first minor in the ring interferometer, and the optical parametric amplifier is disposed in the optical path between the first and second minors in the ring interferometer.

4. A quantum entanglement generating system as set forth in claim 1 wherein the optical path of the ring interferometer is a rectangular optical path in which the beam splitter and a first, a second and a third of the mirrors are arranged in turn anticlockwise, and wherein the optical parametric amplifier is disposed in the optical path between the first and second minors in the ring interferometer, and the dispersive medium is disposed in the optical path between the beam splitter and the third minor in the ring interferometer.

5. A quantum entanglement generating system as set forth in claim 3 or claim 4 wherein on the optical axis there is disposed a condenser means, each between the optical parametric amplifier and the first minor and between the optical parametric amplifier and the second minor.

6. A quantum entanglement generating system as set forth in claim 1 wherein the optical parametric amplifier has an optical waveguide structure consisting of an electrooptic crystal.

7. A quantum entanglement generating system as set forth in claim 1 wherein the dispersive medium consists of two glass plates.

8. A quantum entanglement generating system as set forth in claim 1 wherein the laser light source comprises a light source for producing a light beam of light frequency $f_0$ and a second harmonic generator for converting the incident light beam of light frequency $f_0$ from the light source into a light beam of light frequency $2f_0$.

9. A quantum entanglement generating system as set forth in claim 8 wherein the second harmonic generator has an optical waveguide structure consisting of an electrooptic crystal.

10. A quantum entanglement generating system as set forth in claim 1 wherein the beam splitter has a transmissivity and a reflectance of about 50%, alike to both light beams of light frequency $f_0$ and light frequency $2f_0$.

11. A quantum entanglement generating system as set forth in claim 1 wherein the ring interferometer is formed on a plane.

12. A quantum entanglement generating method comprising:

producing a light beam of light frequency $2f_0$ from a laser light source;

injecting the light beam from the laser light source into a ring interferometer comprising a beam splitter and a plurality of mirrors, the beam splitter and mirrors forming an optical path in the form of a ring;

splitting the injected light beam at the beam splitter into two light beams traveling mutually contrariwise in direction of advance in the ring interferometer;

advancing one of the split light beams from an optical parametric amplifier disposed in the optical path of the ring interferometer into a dispersive medium disposed in the optical path of the ring interferometer, to generate a first squeezed light beam of light frequency $f_0$; advancing the other of the split light beams from the dispersive medium into the optical parametric amplifier to generate a second squeezed light beam of light frequency $f_0$; and setting relative phase between the first and second squeezed light beams at a selected value through the dispersive medium, and combining the first and second squeezed light beams at the beam splitter, thereby generating quantum entangled beams.

13. A quantum entanglement generating method as set forth in claim 12 wherein the relative phase between the first and second squeezed light rays is set at $\pi/2$.

14. A quantum entanglement generating method as set forth in claim 12 wherein the quantum entangled beams comprises a first quantum entangled beam passing through the beam splitter and a second quantum entangled beam reflecting on the beam splitter.

15. A quantum entanglement generating and detecting system comprising:

a light source part comprising a pulsed laser light source of light frequency $f_0$ and a second harmonic generator into which the light beam of light frequency $f_0$ is incident to produce a light beam of light frequency $2f_0$, the light source part emitting a pulsed laser light beam of light frequency $f_0$ and a pulsed laser light beam of light frequency $2f_0$ on a common axis;

a ring interferometer comprising a beam splitter and a plurality of mirrors, the beam splitter and mirrors forming an optical path in the form of a ring;

an optical parametric amplifier inserted in the optical path of the ring interferometer for producing a light beam of light frequency $f_0$ upon receiving a light beam of light frequency $2f_0$ incident into the optical parametric amplifier;

a dispersive medium inserted in the optical path of the ring interferometer ; and a homodyne detector, wherein the light beam of light frequency $2f_0$ from the laser light source injects into the beam splitter, the beam splitter splits the light beam of light frequency $2f_0$ into two light beams travelling mutually contrariwise in direction of advance in the ring interferometer, the two light beams injected into the optical parametric amplifier to generate a first and a second linearly polarized, squeezed light beam of light frequency $f_0$ traveling mutually contrariwise in direction of advance in the ring interferometer, the dispersive medium adjusts the relative phase between the first and second squeezed light beams at a selected value, the beam splitter combines the first and second squeezed light beams to generate a linearly polarized quantum entangled beam of light frequency $f_0$, as a signal light beam the linearly polarized quantum entangled beam of light frequency $f_0$, and as a local-oscillator light beam the pulsed laser light beam of light frequency $f_0$ emitted from the light source part and having a polarization orthogonal to the signal light beam, are both incident into the homodyne detector to detect a quadrature amplitude.

16. A quantum entanglement generating and detecting system as set forth in claim 15 wherein the quantum entangled beams comprises a first and a second quantum entangled beam and the homodyne detector comprises a first and a second homodyne detector, the first and second quantum entangled beams constituting signal light beams to the first and second homodyne detectors, respectively.

17. A quantum entanglement generating and detecting system as set forth in claim 15 wherein the beam splitter has a transmissivity and a reflectance of about 50%, alike to both a horizontally polarized light beam of light frequency $f_0$ and a horizontally polarized light beam of light frequency $2f_0$, and has a reflectance of about 100% to a vertically polarized light ray of light frequency $f_0$.

18. A quantum entanglement generating and detecting system as set forth in claim 15 wherein the homodyne detector comprises:

an electrooptic crystal into which the signal light beam and the local-oscillator light beam are incident, a half wave plate for polarizing the light beams incident into the electrooptic crystal, a beam splitter for combining the light beams polarized at the half wave plate to split into a transmitted and a reflected light beam, detectors for sensing the two light beams split into by the beam splitter, respectively, and a means for providing a differential between outputs from the detectors.

19. A quantum entanglement generating and detecting system as set forth in claim 15 wherein the homodyne detector comprises a filter into which the signal light beam and the local-oscillator light beam are incident for transmitting the light frequency $f_0$ and light frequency $2f_0$, a quarter wave plate for varying a phase between the light beams from the filter, a beam splitter for combining the light beams from the quarter wave plate and for splitting into a transmitted and a reflected light beam, detectors for sensing the two light beams split into by the beam splitter, respectively, and a means for providing a differential between outputs from the detectors.

20. A quantum entanglement generating and detecting system as set forth in claim 15, further comprising a dispersive medium disposed between the signal and local-oscillator light beams and the homodyne detector wherein the homodyne detector comprises a filter for transmitting a light beam of light frequency $f_0$ and a light beam of light frequency $2f_0$ out of light beams passing through the dispersive medium, a beam splitter for combining light beams from the filter to split into a transmitted and a reflected light beam, detectors for sensing the two light beams split into by the beam splitter, respectively, and a means for providing a differential between outputs from the detectors.

21. A quantum entanglement generating and detecting system as set forth in claim 15 wherein the ring interferometer is formed on a plane.

22. A quantum entanglement generating and detecting method comprising:

producing, on a common optical axis, a light beam of light frequency $f_0$ from a laser light source and a light beam of light frequency $2f_0$ generated via a second harmonic generator from the laser light source;

injecting the light beam of light frequency $2f_0$ from the laser light source into a ring interferometer comprising a beam splitter and a plurality of mirrors, the beam splitter and minors forming an optical path in the form of ring;

splitting the injected light beam at the beam splitter into two light beams traveling mutually contrariwise in direction of advance in the ring interferometer;

advancing one of the split light beams from an optical parametric amplifier disposed in the optical path of the ring interferometer into a dispersive medium disposed in the optical path of the ring interferometer, to generate a first linearly polarized, squeezed light beam of light frequency $f_0$;

advancing the other of the split light beams from the dispersive medium into the optical parametric amplifier to generate a second linearly polarized, squeezed light beam of light frequency $f_0$;

setting relative phase between the first and second squeezed light beams at a selected value through the dispersive medium; and combining the first and second squeezed light beams at the beam splitter, thereby generating linearly polarized quantum entangled beams of light frequency $f_0$;

deriving from the horizontally polarized quantum entangled beams of light frequency $f_0$, a signal light beam for a homodyne detector;

passing the light beam of light frequency $f_0$ from the laser light source through the ring interferometer via an optical path identical to that for the one light beam split into by the beam splitter, to provide a light beam of a polarization orthogonal to the signal light beam for use as a local-oscillator light beam for the homodyne detector; and the homodyne detector detecting a quadrature amplitude of the signal light beam.

23. A quantum entanglement generating and detecting method as set forth in claim 22 wherein a filter for blocking the light beam of light frequency $2f_0$ is inserted on an optical axis, each in front and rear of the optical parametric amplifier to suspend generation of the quantum entangled beams.

* * * * *